US012542059B2

(12) United States Patent
Liu et al.

(10) Patent No.: US 12,542,059 B2
(45) Date of Patent: Feb. 3, 2026

(54) METHOD, DEVICE AND SYSTEM FOR ACTIVE MANAGEMENT AND CONTROL OF ROAD TRAFFIC SAFETY

(71) Applicant: CCCC FIRST HIGHWAY CONSULTANTS CO., LTD., Xi'an (CN)

(72) Inventors: Jianbei Liu, Xi'an (CN); Xiaolong Ma, Xi'an (CN); Bin Zhao, Xi'an (CN); Zhu Sun, Xi'an (CN); Tianyi Chen, Xi'an (CN); Yuanyuan Ma, Xi'an (CN); Yuxin Li, Xi'an (CN); Ling Wu, Xi'an (CN); Zhaoming Tian, Xi'an (CN)

(73) Assignee: CCCC FIRST HIGHWAY CONSULTANTS CO., LTD., Xi'an (CN)

( * ) Notice: Subject to any disclaimer, the term of this patent is extended or adjusted under 35 U.S.C. 154(b) by 0 days.

(21) Appl. No.: 19/015,866

(22) Filed: Jan. 10, 2025

(65) Prior Publication Data
US 2025/0336296 A1 Oct. 30, 2025

(30) Foreign Application Priority Data
Jan. 16, 2024 (CN) .......................... 202410062609.5

(51) Int. Cl.
*G08G 1/16* (2006.01)
*G06N 3/0464* (2023.01)
(Continued)

(52) U.S. Cl.
CPC .......... *G08G 1/164* (2013.01); *G06N 3/0464* (2023.01); *G06N 3/086* (2013.01); *G08G 1/0116* (2013.01);
(Continued)

(58) Field of Classification Search
CPC .... G08G 1/164; G08G 1/0116; G08G 1/0133; G08G 1/0141; G08G 1/0145;
(Continued)

(56) References Cited

U.S. PATENT DOCUMENTS 6,662,141 B2 * 12/2003 Kaub .................. G08G 1/0104
702/181
8,825,277 B2 * 9/2014 McClellan ............. G06Q 10/06
701/34.2
(Continued)

FOREIGN PATENT DOCUMENTS

CN      106408956 A    2/2017
CN      108415789 A    8/2018
(Continued)

OTHER PUBLICATIONS

Wu, Ling et al.; "Motorway Interchange Lane-level travelling speed in merging area Speed Characteristics and Short-Time Prediction Model Research," Highway, Nov. 13, 2023; pp. 182-191; link.cnki.net/urlid/11.1668.U.20231110.1534.056.
(Continued)

*Primary Examiner* — Luis A Martinez Borrero
(74) *Attorney, Agent, or Firm* — Central California IP Group, P.C.; Andrew D. Fortney

(57) ABSTRACT

A method, device and system for active management and control of road traffic safety are disclosed. The method includes acquiring traffic data of a target road in real time, wherein the target road includes management and control sections; for each management and control section, judging whether there is a traffic accident according to the acquired traffic data; if so, formulating an emergency management and control strategy; if not, extracting traffic flow data from the traffic data, and generating predicted traffic flow data according to the traffic flow data by a traffic flow prediction model; generating a risk level according to the predicted
(Continued)

traffic flow data by a risk prediction model; determining the current active management and control strategy of the management and control section according to the risk level and the predicted traffic data; and issuing the corresponding management and control strategy of each of the management and control sections.

20 Claims, 15 Drawing Sheets

(51) Int. Cl.
    *G06N 3/086*      (2023.01)
    *G08G 1/01*      (2006.01)
    *G08G 1/015*      (2006.01)
    *G08G 1/052*      (2006.01)

(52) U.S. Cl.
    CPC ......... *G08G 1/0133* (2013.01); *G08G 1/0141* (2013.01); *G08G 1/0145* (2013.01); *G08G 1/015* (2013.01); *G08G 1/052* (2013.01); *G08G 1/166* (2013.01)

(58) Field of Classification Search
    CPC ........ G08G 1/015; G08G 1/052; G08G 1/166; G06N 3/0464; G06N 3/086
    USPC .......................................................... 701/301
    See application file for complete search history.

(56) References Cited

U.S. PATENT DOCUMENTS

| | | | | | |
|---|---|---|---|---|---|
| 10,497,259 | B2* | 12/2019 | Liu | ...................... | G08G 1/0145 |
| 10,733,460 | B2* | 8/2020 | Heck | ...................... | G06V 20/58 |
| 11,827,237 | B2* | 11/2023 | Kilaru | ...................... | G06N 20/00 |
| 12,345,533 | B2* | 7/2025 | Lindberg | ............. | G08G 1/0129 |
| 2002/0082806 | A1* | 6/2002 | Kaub | ...................... | G08G 1/164 |
| | | | | | 702/182 |
| 2011/0035141 | A1* | 2/2011 | Barker | ................. | G08G 1/0104 |
| | | | | | 701/119 |
| 2012/0109506 | A1* | 5/2012 | Fei | ........................ | G08G 1/0116 |
| | | | | | 701/118 |
| 2018/0144634 | A1* | 5/2018 | Kim | ........................ | G08G 1/164 |
| 2021/0217307 | A1* | 7/2021 | Abdel-Aty | ........... | G08G 1/0116 |
| 2022/0014963 | A1* | 1/2022 | Yeh | .................... | H04W 28/0268 |

FOREIGN PATENT DOCUMENTS

| | | |
|---|---|---|
| CN | 112053561 A | 12/2020 |
| CN | 112419709 A | 2/2021 |
| CN | 114863686 A | 8/2022 |
| CN | 116189428 A | 5/2023 |
| CN | 116913093 A | 10/2023 |
| CN | 117275260 A | 12/2023 |

OTHER PUBLICATIONS

Shan, Yanan; :Urban Expressway Traffic Accident Characteristics, Prevention and Control Strategies Research . . . ; China Outstanding Master's Degree Thesis Engineering Science and Technology II Series, Jan. 15, 2023; 114 pgs.; China Academic Journal Electronic Publishing House; ckni.net.

Guo, Zhi; "Based on multi-source heterogeneous data Mining of Highway Traffic Risk Highway Traffic Risk Coupling Identification and Control of Traffic Risks," China Outstanding Master's Degree Thesis Engineering Science and Technology I Series, Mar. 15, 2023; 70 pgs.; China Academic Journal Electronic Publishing House; ckni.net.

Office Action, Chinese Pat. Appl. No. 202410062609.5; Jun. 28, 2024; China National Intellectual Property Administration, Beijing, China.

Notification to Grant Patent Right for Invention, Chinese Pat. Appl. No. 202410062609.5; Jul. 30, 2024; China National Intellectual Property Administration, Beijing, China.

* cited by examiner

METHOD, DEVICE AND SYSTEM FOR ACTIVE MANAGEMENT AND CONTROL OF ROAD TRAFFIC SAFETY

The present application claims the priority of Chinese patent application no. 202410062609.5, filed Jan. 16, 2024, the contents of which are hereby incorporated by reference in its entirety.

TECHNICAL FIELD

The present invention relates to the technical field of active management and control for road traffic safety, and more particularly to a method, a device and a system for active management and control of road traffic safety.

BACKGROUND ART

At present, in the process of road traffic safety management, the corresponding management and control measures are often taken after the occurrence of traffic accidents for on-site treatment to avoid the occurrence of secondary traffic accidents and restore the normal traffic flow as soon as possible. It is often passive to take the management and control measures after the accident.

With the increase of traffic volume, the traditional passive man-based management methods are no longer suitable for the current road section and even the road network traffic safety management. The active management and control of road traffic operation is to change the driving behavior of traffic participants before the accident by implementing the management and control strategy, and then adjust the traffic situation. The active management and control of road traffic operation can realize real-time detection and dynamic adjustment, and ultimately reduce traffic accidents, avoid traffic congestion and improve the level of traffic safety.

There have been many studies on active management and control of road traffic safety, such as, Chinese patent application number 2020109342870 discloses a method for selecting an active management and control strategy for road traffic operation, which simulates traffic flow by a following/lane change model, and deduces in a model and selects a management and control strategy by matching historical management and control schemes on the basis of traffic flow. To a certain extent, it can also achieve active management and control, but road safety is restricted and affected by a variety of risk factors. The management and control strategy derived from historical management and control program only by a single traffic flow state may have poor management and control effect.

SUMMARY OF THE INVENTION

An object of the present invention is to overcome the problems of existing active traffic safety management and control, and to provide a method, a device and a system for active management and control of road traffic safety.

In order to achieve the above object, the present invention adopts the following technical solutions.

An active management and control method for road traffic safety comprises:
  real time acquiring traffic data of a target road, which comprises a plurality of management and control sections;
  for each of the management and control sections, judging whether there is a traffic accident according to the acquired traffic data; if so, formulating an emergency management and control strategy; if not, extracting first traffic flow data from the acquired traffic data based on a first pre-set time window, generating predicted traffic flow data according to the first traffic flow data by a pre-constructed traffic flow prediction model, generating predicted traffic data based on the predicted traffic flow data, and generating a first risk level according to the predicted traffic data by a pre-constructed risk prediction model; and determining an active management and control strategy of a current time period of the management and control section according to the first risk level and the predicted traffic data by an optimization algorithm; and
  issuing an emergency management and control strategy or an active management and control strategy corresponding to each of the management and control sections;
  wherein the optimization algorithm takes a current management and control section accident rate being minimum and a section passage efficiency being maximum in a unit time as an optimization target to obtain the position of the control point to be activated and the optimal active management and control strategy corresponding to the activated control point by iterative calculation; the active management and control strategy comprises a speed management and control strategy associated with a vehicle type, a lane, and a passage management and control strategy; and
  the control point is a management and control strategy issuing point set in advance according to road management and control requirements in the management and control section.

According to a specific embodiment, in the above-mentioned active management and control method for road traffic safety, the traffic data comprises driver data, traffic flow data, road data, and environment data;
  the driver data comprises fatigue and dangerous driving behavior information;
  the traffic flow data comprises vehicle speed information, vehicle type information and cross-section traffic flow information;
  the road data comprises road line type, lane number and lane width information; and
  the environmental data comprises visibility, rainfall, snowfall, road friction coefficient, wind force, and wind direction information.

According to a specific embodiment, in the above-mentioned active management and control method for road traffic safety, the method further comprises a judgment step before the determining an active management and control strategy of a current time period of the management and control section according to the first risk level and the predicted traffic data by an optimization algorithm;
  the judgment step comprises judging whether the first risk level reaches a pre-set level; if so, calculating to obtain an active management and control strategy of the current time period of the management and control section according to the first risk level and the predicted traffic data by the optimization algorithm; and if not, taking the normalized control strategy as the active management and control strategy of the control section.

According to a specific embodiment, in the above-mentioned active management and control method for road traffic safety, the formulating an emergency management and control strategy comprises: when taking the traffic accident as a time node, extracting second traffic flow data from the acquired traffic data based on a second pre-set time window, generate predicted traffic flow data according to the second traffic flow data by the pre-constructed traffic flow prediction model, generating predicted traffic data based on the predicted traffic flow data, and generating a second risk level according to the predicted traffic data by the pre-constructed risk prediction model; and generating the emergency management and control strategy based on the second risk level and the predicted traffic data by the optimization algorithm.

According to a specific embodiment, in the above-mentioned active management and control method for road traffic safety, the second pre-set time window is less than the first pre-set time window.

According to a specific embodiment, in the above-mentioned active management and control method for road traffic safety, the optimization algorithm is a genetic algorithm.

According to a specific embodiment, in the above-mentioned active management and control method for road traffic safety, the traffic flow prediction model is constructed in advance based on the modified TST model;
wherein the modified TST model is a TST model added with a position vector encoding layer and a multi-headed attention mechanism layer; and the position vector encoding layer and the multi-headed attention mechanism layer are configured for performing time sequence information modeling on an input vector.

According to a specific embodiment, in the above-mentioned active management and control method for road traffic safety, the position vector encoding layer is a learning-type position encoder.

According to a specific embodiment, in the above-mentioned active management and control method for road traffic safety, the modified TST model further comprises a masking layer disposed between the position vector encoding layer and the multi-head attention mechanism layer; and
the fill masking is performed by the masking layer on the position-coded input vector based on a Softmax function.

According to a specific embodiment, in the above-mentioned active management and control method for road traffic safety, the traffic risk prediction model is constructed in advance by a method comprising:
acquiring historical traffic data and historical accident data thereof corresponding to a target road, and determining a plurality of target risk level intervals based on the historical traffic data and the historical accident data thereof;
constructing a plurality of data sample vectors based on the historical traffic data, and performing normalization processing and risk level marking on the data sample vectors based on the plurality of target risk level intervals; and
training a convolution neural network by the marked data sample vector, and after the convolution neural network satisfies condition convergence, taking the trained convolution neural network as the traffic risk prediction model.

According to a specific embodiment, in the above-mentioned active management and control method for road traffic safety, the traffic risk prediction model is constructed in advance by a method comprising:
acquiring traffic conflict data corresponding to a target road, and determining a plurality of target risk level intervals based on the traffic conflict data; and constructing the traffic risk prediction model based on the traffic conflict data and the target risk level interval thereof.

In another aspect of the present invention, an active management and control device for road traffic safety is provided, comprising an acquisition unit, a first calculation unit, a plurality of parallel second calculation units and third calculation units, and a strategy issuing unit;
wherein the acquisition unit is configured for acquiring traffic data of a target road in real time, and the target road comprises a plurality of management and control sections;
the first calculation unit is configured for judging whether there is a traffic accident in the acquired traffic data for each of the management and control sections; if so, starting one of the second calculation units for the management and control section where the accident occurs, and starting one of the third calculation units for the remaining management and control sections; if not, starting the third calculation unit for each of the management and control sections;
the second calculation unit is configured for formulating an emergency management and control strategy for the management and control section where the traffic accident occurs;
the third calculation unit is configured for extracting first traffic flow data from the acquired traffic data based on a first pre-set time window, generating predicted traffic flow data according to the first traffic flow data by a pre-constructed traffic flow prediction model, generating predicted traffic data based on the predicted traffic flow data, and generating a first risk level according to the predicted traffic data by a pre-constructed risk prediction model; and determining an active management and control strategy of a current time period of the management and control section according to the first risk level and the predicted traffic flow data by an optimization algorithm; and
the strategy issuing unit is configured for issuing an emergency management and control strategy or an active management and control strategy corresponding to each of the management and control sections.

According to a specific embodiment, in the above-mentioned active management and control device for road traffic safety, the second calculation unit is configured for
when taking the traffic accident as a time node, extracting second traffic flow data from the acquired traffic data based on a second pre-set time window, generate predicted traffic flow data according to the second traffic flow data by the pre-constructed traffic flow prediction model, generating predicted traffic data based on the predicted traffic flow data, and generating a second risk level according to the second traffic flow data by the pre-constructed risk prediction model; and generating the emergency management and control strategy based on the second risk level and the predicted traffic flow data by the optimization algorithm.

According to a specific embodiment, in the above-mentioned active management and control device for road traffic safety, the third calculation unit comprises:
an extraction module configured for extracting first traffic flow data from the acquired traffic data based on a first pre-set time window;
a traffic flow prediction module configured for generating predicted traffic flow data according to the first traffic flow data by a pre-constructed traffic flow prediction model, and generating predicted traffic data based on the predicted traffic flow data;

a risk prediction module configured for generating a first risk level according to the predicted traffic data by a pre-constructed risk prediction model; and a strategy generation module configured for determining an active management and control strategy of a current time period of the management and control section according to the first risk level and the predicted traffic flow data by an optimization algorithm.

In another aspect of the present invention, an active management and control system for road traffic safety is provided, comprising:

a roadside sensing apparatus configured for acquiring real-time traffic data of a target road and transmitting same to an active road traffic safety management and control device, wherein the roadside sensing apparatus is disposed at intervals in a plurality of management and control sections of a target road;

an active management and control device for road traffic safety configured for generating an emergency management and control strategy or an active management and control strategy of the target road by the above-mentioned active management and control method for road traffic safety, and outputting same to a strategy issuing apparatus; and a strategy issuing apparatus disposed at intervals in a plurality of management and control sections of the target road for visually presenting the emergency management and control strategy or the active management and control strategy.

The invention has the following beneficial effects compared to the prior art.

According to the method provided by an embodiment of the present invention, traffic data of a plurality of management and control sections is acquired in real time. An emergency management and control strategy is generated to manage and control an accident when a traffic accident occurring on the management and control section is acquired. The predicted traffic flow data is generated according to the real-time traffic flow data based on a pre-established traffic flow prediction model when no traffic accident occurs on the management and control section, and the predicted traffic data is further generated, and the risk level prediction for the next time period is performed according to the predicted traffic data combined with an accident risk model, so as to combine the traffic flow prediction and the accident risk prediction. According to the prediction results, an active management and control strategy is established by the optimization algorithm. According to this, this method predicts and senses the risk state of the traffic flow of the management and control section actively when no accident is issued by establishing the traffic flow in advance, predicting the risk state of the current section, and using the optimization algorithm according to the risk state, and takes the relevant management and control measures for the high-risk traffic flow state, so as to effectively reduce the number of accidents based on active safety management and control, and achieve the improvement of road traffic safety level and traffic efficiency.

A method provided by an embodiment of the present invention, on the basis of a conventional emergency management and control strategy, when an accident is detected, a risk level according to traffic flow data corresponding to the accident is evaluated by a pre-constructed accident risk model, and the management and control strategy is formulated according to the risk level. Therefore, this method can effectively and accurately develop emergency strategies to match the accident and improve road safety.

3. According to the modified TST model provided by embodiments of the present invention, the attention mechanism as well as the position vector are adopted to capture long-term dependencies of time series data, allowing information to propagate over longer sequences, which can be adapted to short-term predictions.

DETAILED DESCRIPTION

Hereinafter, the present invention will be described in further detail with reference to Experimental Examples and Detailed Description. However, it should not be understood that the scope of the above-described subject matter of the present invention is limited to the following examples, and it is intended that on the present disclosure falls within the scope of the present invention.

Example 1

Figure 1:
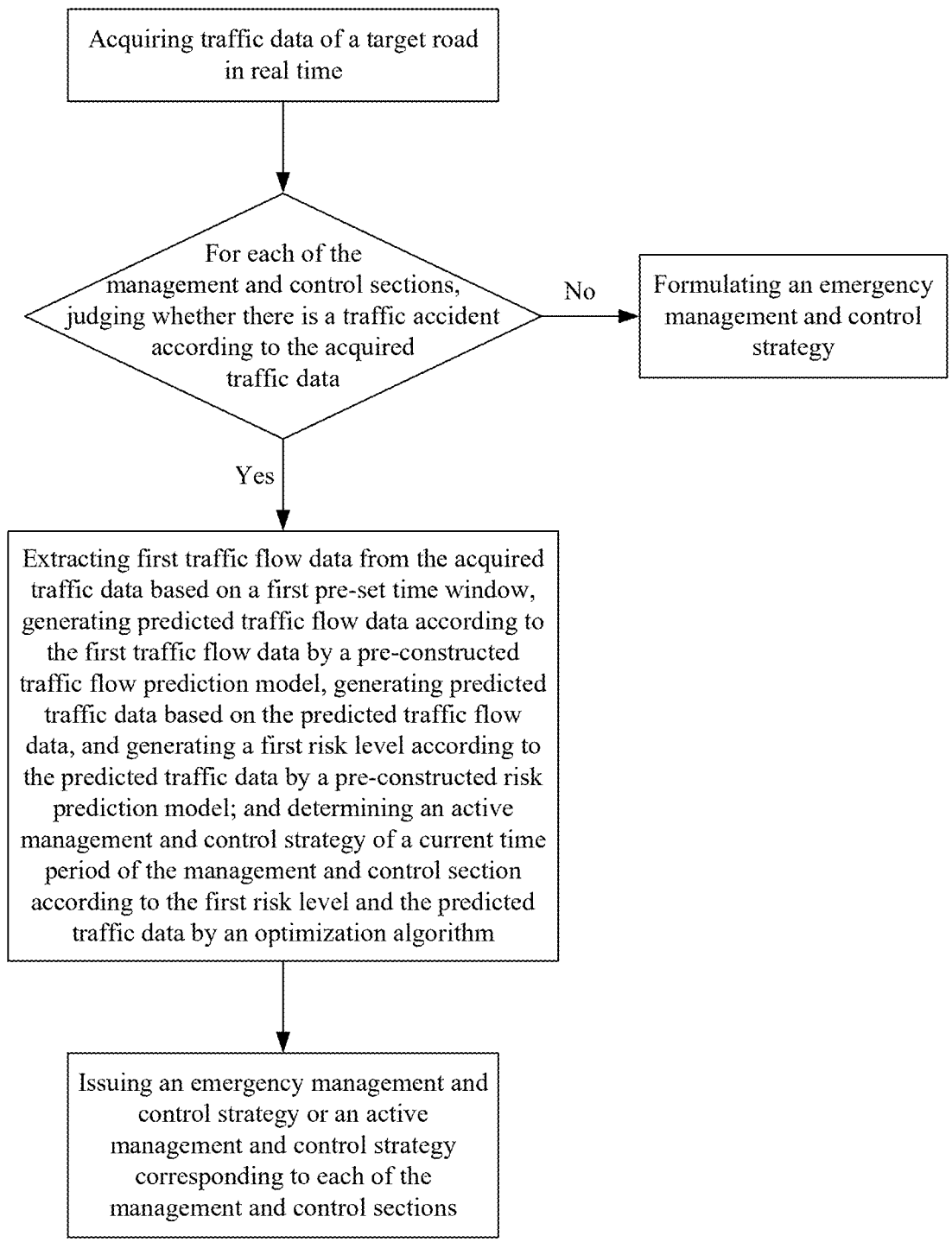
FIG. 1 is a flowchart showing a method for active management and control of road traffic safety according to an exemplary embodiment of the present invention.

FIG. 1 illustrates a method for active management and control of road traffic safety according to an exemplary embodiment of the present invention, including:
S1, acquiring traffic data of a target road in real time, wherein the target road comprises a plurality of management and control sections;
S2, for each of the management and control sections, judging whether there is a traffic accident according to the acquired traffic data; if so, formulating an emergency management and control strategy; if not, extracting first traffic flow data from the acquired traffic data based on a first pre-set time window, generating predicted traffic flow data according to the first traffic flow data by a pre-constructed traffic flow prediction model, generating predicted traffic data based on the predicted traffic flow data, and generating a first risk level according to the predicted traffic data by a pre-constructed risk prediction model; and determining an active management and control strategy of a current time period of the management and control section according to the first risk level and the predicted traffic data by an optimization algorithm; and
S3, issuing an emergency management and control strategy or an active management and control strategy corresponding to each of the management and control sections.

The traffic accidents include a rear-end collision, a side collision, a rollover accident, a continuous collision, etc. The above-mentioned traffic flow prediction model can use one of time series models such as LSTM, TCN time series convolution neural networks and BILSTM, and the above-mentioned risk prediction model can adopt one of neural networks such as BP and RBF. The above-mentioned first pre-set time window is a time set according to monitoring requirements, for example, 5 min. The above-mentioned active management and control strategy is a management and control strategy set according to actual road management and control requirements, for example, pre-setting one or more combinations of common highway active traffic management and control strategies as active management and control strategies. Herein, the common highway active traffic management and control strategies comprise a speed management and control strategy, a lane management and control strategy, a ramp management and control strategy, a vehicle type management and control strategy, an emergency lane management and control strategy, etc.

It can be understood that the existing active traffic control methods often use a single model to predict single data, and generate a strategy based on the single data. Thus, there will be a problem of poor control effect. In addition, in the present application, not only considering the traffic flow operation situation at the current moment, but further considering the road traffic operation state at a future moment, it solves the possible road risks at the current moment by appropriate management and control means so as to ensure the road operation safety to the maximum extent. In addition, this patent is able to establish a control strategy that fully conforms to current road conditions and traffic flow conditions, with a higher degree of control accuracy.

In the present embodiment, traffic data of a plurality of management and control sections is acquired in real time. When an accident occurring on the management and control section is acquired, an emergency management and control strategy is generated for accident management and control. When no traffic accident occurs on the management and control section, the prediction traffic flow data is generated according to the real-time traffic flow data based on a pre-constructed traffic flow prediction model, a risk level prediction is performed for the next time period according to the prediction traffic flow data combined with the accident risk model, and an active management and control strategy is formulated according to the prediction result. According to this, the method establishes traffic flow and risk prediction in advance to predict the risk state of the current road section, actively predicts and senses the change of the risk state of the traffic flow on the road section when no accident is issued by the optimization algorithm according to the risk state, and takes relevant management and control measures for the high-risk traffic flow state, thus effectively reducing the number of accidents based on active safety management and control, and achieving the improvement of road traffic safety level and traffic efficiency.

Example 2

Figure 2:
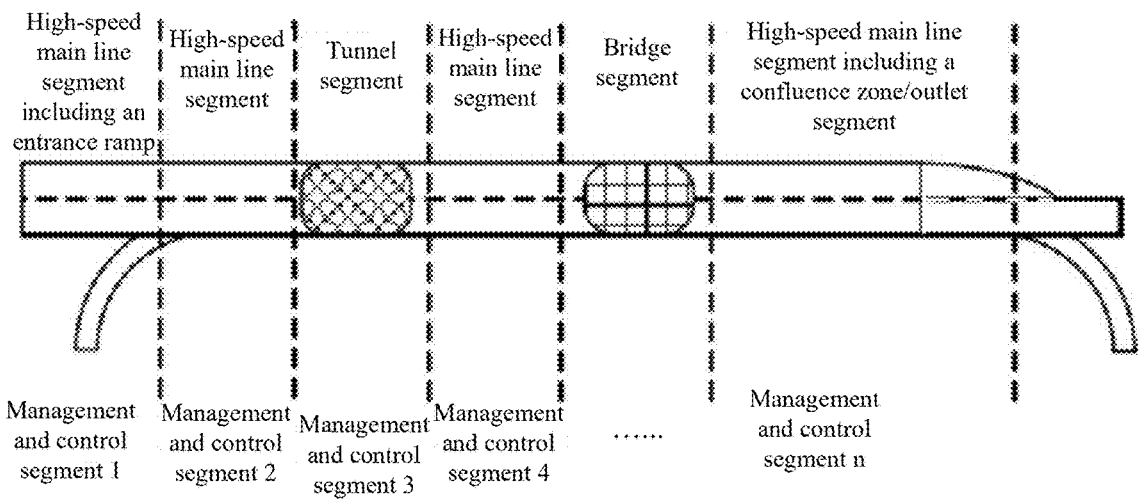
FIG. 2 is a schematic view of a target road according to an exemplary embodiment of the present invention.

In a possible embodiment, taking the example of the target road in S1 being a highway, as shown in FIG. 2, a plurality of the management and control sections are divided in advance in the highway in such a way that the highway is divided into several sub-sections by taking the import and export of vehicles, such as an entrance ramp, an exit ramp and special sections, such as bridges, tunnels and merging areas, as key nodes. Each highway sub-section is the management and control section to be obtained in the active management and control method of road traffic safety. Preferably, when the distance between the key nodes is large, the key nodes should be added at appropriate positions in the management and control sections according to specific embodiments, and the sub-sections should be divided twice. When two key nodes are recombined or close to each other, the two key points are merged into one key point to divide the management and control section.

Figure 3A:
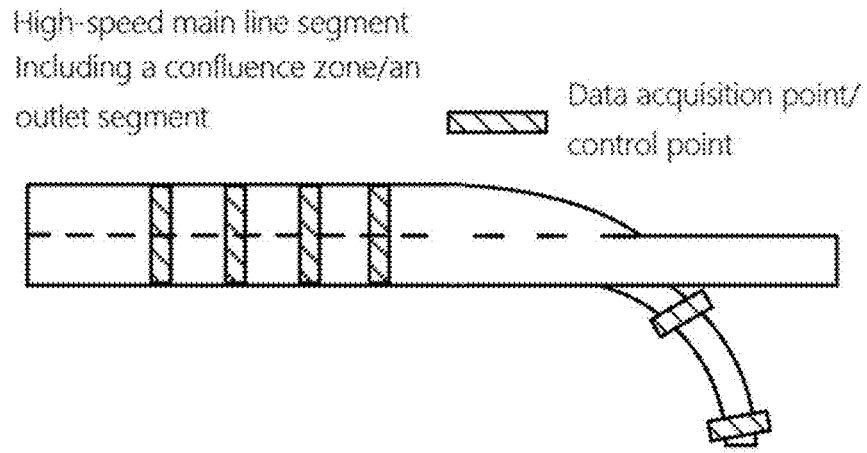
FIG. 3A is a first schematic view of dividing a management and control section in a target road according to an exemplary embodiment of the present invention.
Figure 3B:
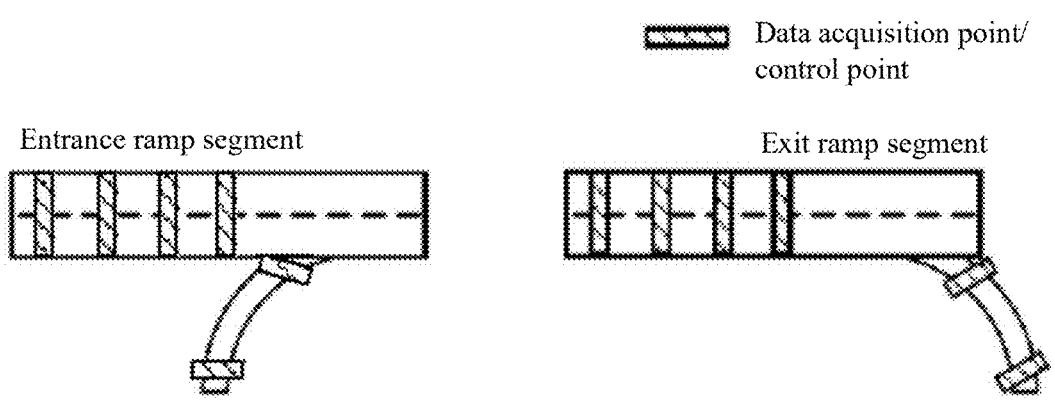
FIG. 3B is a second schematic view of dividing a management and control section in a target road according to an exemplary embodiment of the present invention.
Figure 3C:
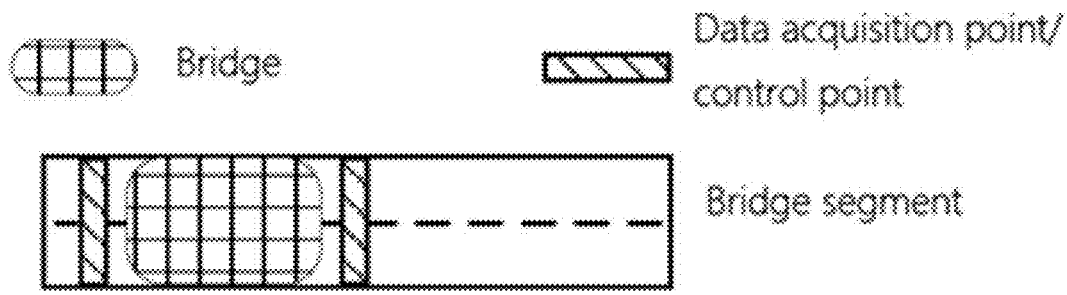
FIG. 3C is a third schematic view of dividing a management and control section in a target road according to an exemplary embodiment of the present invention.
Figure 3D:
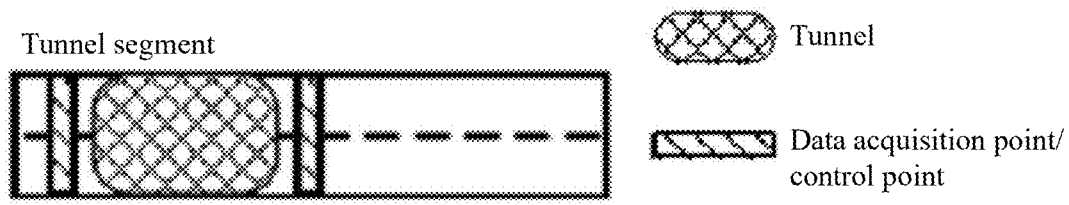
FIG. 3D is a fourth schematic view of dividing a management and control section in a target road according to an exemplary embodiment of the present invention.

It will be appreciated that a plurality of control points (control points for regulatory policy release) and data collection points (for collecting traffic data) will be contained within each management and control section. In a possible embodiment, the control points and the data acquisition points should ideally be installed on the same section cross-section. As shown in FIG. 3A, in a main line road management and control section of a highway including a merging area, each tollgate is used as a layout position of a control point and a data collection point. If the tollgate frame is spaced too long, a new gantry or a variable information board should be erected between two tollgate frame spaced too far as the control point and the data collection point according to the actual situation of the road. Herein, a corresponding speed management and control strategy is applied by the control point to different types of motor vehicles in different lanes via the variable information board. The acquisition point acquires traffic data in real time by traffic flow sensing apparatus such as a camera and a radar. As shown in FIG. 3B, in a highway main line road management and control section including an entrance ramp and an exit ramp, corresponding control points and data collection points are also provided at the entrance and exit of the ramp in addition to using a tollgate frame as a layout position of a control point and a data collection point. As shown in FIG. 3C, in a management and control section taking a bridge as a main component, a control point and a data collection point are set at the entrance and exit of the bridge. When the length of the bridge is long, whether to set the control point and the data collection point inside the bridge is determined according to a specific embodiment, and the corresponding control point and the data collection point are set on the charging portal frame for the remaining main line parts. As shown in FIG. 3D, in a management and control section with a tunnel as a main component, a control point and a data collection point are set at the entrance and exit of the tunnel. When the length of the tunnel is long, whether to set the control point and the data collection point inside the tunnel is determined according to a specific embodiment, and the corresponding control point and data collection point are set on the charging portal for the remaining main line part.

Figure 4:
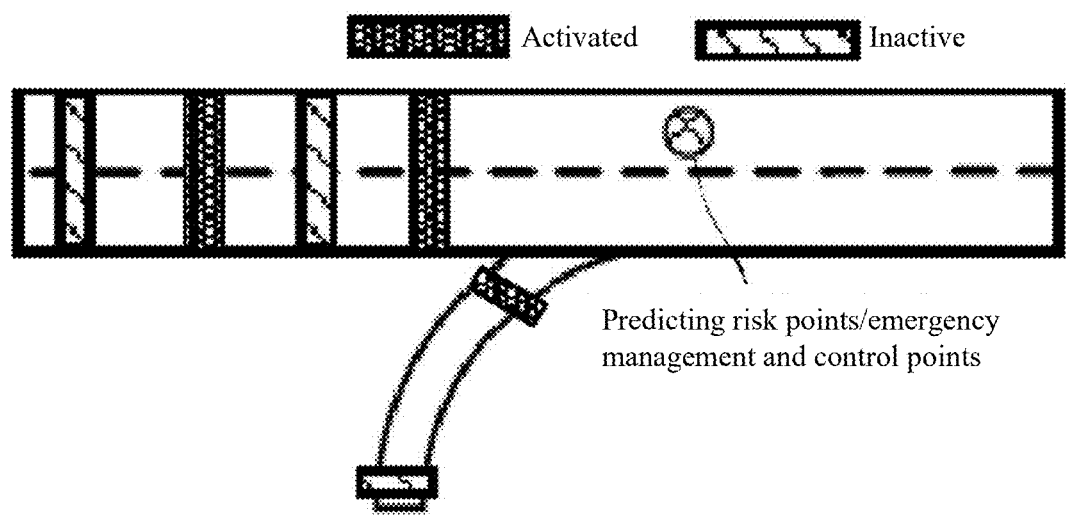
FIG. 4 is a schematic view showing an activation strategy of a control point of a management and control section according to an exemplary embodiment of the present invention.

Preferably, as shown in FIG. 4, after a risk point or an emergency management point (an accident point) occurs on a management and control section, the generated management and control strategy will be issued to a plurality of control points in opposite directions running from the risk point or the emergency management point to the vehicle flow, and it is determined whether the plurality of control points are activated according to the management and control strategy.

In a possible embodiment, the traffic data acquired in S1 above comprises driver data, traffic flow data, road data, and environment data. The driver data includes fatigue, dangerous driving behavior information, etc. The traffic flow data comprises vehicle speed information, vehicle type information, and cross-section traffic flow information, etc. The road information includes road line types, number of lanes, lane width information, etc. The environmental information comprises visibility, rainfall, snowfall, road friction coefficient, wind force, wind direction information, etc. The generating predicted traffic data based on the predicted traffic flow data comprises:
    replacing the traffic flow data in the extracted traffic data by the predicted traffic flow data, and fusing the same with other traffic data (road data, environment data, etc.) to obtain the predicted traffic data.

Specifically, the traffic data acquired in the present embodiment mainly includes roadside sensing systems for roadside construction and traffic information provided by social vehicles. Among them, the road detection and sensing equipment for highway construction includes hardware facilities such as video, coil, radar and meteorological stations. The social information comprises traffic flow state and traffic event information provided by past drivers, and road information and environment information obtained by means of the Internet, etc. The road information comprises a road line shape, a road surface friction coefficient, etc. The environmental information includes meteorological information, geological disasters and other relevant information that may affect safe driving.

According to a specific embodiment, in the above-mentioned active management and control method for road traffic safety, the method further comprises a judgment step before the determining an active management and control strategy of a current time period of the management and control section according to the first risk level and the predicted traffic data by an optimization algorithm;
    the judgment step comprises judging whether the first risk level reaches a pre-set level; if so, calculating to obtain an active management and control strategy of the current time period of the management and control section according to the first risk level and the predicted traffic data by the optimization algorithm; and if not, taking the normalized control strategy as the active management and control strategy of the control section.

It can be understood that in the existing road management and control technology, there will be some normative management and control strategies. For example, normative speed limit strategies for some road sections, etc. Therefore, in this embodiment, by the preset risk level judgement mechanism, when the predicted risk level does not meet the preset level and the current road section is in a relatively safe operation state, it is not necessary to conduct strategy optimization based on an optimization algorithm, and the normative management and control strategy is directly used for management and control, thereby effectively saving calculation amount and improving the active management and control efficiency.

In a possible embodiment, in the S2 above, the formulating an emergency management and control strategy comprises:
    when taking the traffic event as a time node, extracting second traffic flow data from the acquired traffic data based on a second pre-set time window, generating predicted traffic flow data according to the second traffic flow data by a pre-constructed traffic flow prediction model, generating a second risk level according to the second traffic flow data by the pre-constructed risk prediction model, and generating the emergency management and control strategy according to the second risk level and the predicted traffic flow data by the optimization algorithm.

Herein the second pre-set time window is a short time interval (less than the first pre-set time window) set according to actual needs, for example, 30 s, or 1 min.

It can be understood that, in the existing road management and control technology, there is a partially mature emergency management and control strategy, which is configured for responding to an emergent traffic accident, and a corresponding conventional emergency management and control strategy can be directly generated when a traffic accident occurs. However, the corresponding conventional emergency management and control strategy is generated based on human experience, lacks pertinence, and may have a problem of poor management and control effect. Therefore, in this embodiment, when a traffic event occurs, short-term traffic flow data is extracted, and an accurate short-term risk prediction is performed on roads. Finally, an emergency management and control strategy matched with the current road event is generated by combining an optimization algorithm.

In a possible embodiment, in the above-mentioned S2, the optimization algorithm takes a current management and control section accident rate being minimum and a section passage efficiency being maximum in a unit time as an optimization target to obtain the position of the control point to be activated and the management and control strategy corresponding to the activated control point by iterative calculation; the active management and control strategy comprises a speed control strategy associated with a vehicle type, a lane, and a passage management and control strategy; and the control point is a management and control strategy issuing point set in advance according to road management and control requirements in the management and control section.

It can be understood that active traffic control can maximize the functions of traffic infrastructure and road network, and improve traffic capacity and traffic safety. At present, the common highway active traffic management and control strategy functions as follows. Speed management and control: the speed limit is adjusted dynamically according to the real-time traffic state, road state or weather conditions to provide the recommended speed or adjust the speed limit, which can be applied to the whole road section or individual lanes, reduce the vehicle speed gradient, "smooth" the traffic flow, make the speed harmonious, improve the capacity and reduce the risk of accidents. It is often used for road sections that are repeatedly congested or significantly affected by weather. Lane control: it is commonly used to close or open a single lane in case of accident or congestion, and provide close warning through dynamic lane control signs, so as to make vehicles safely merge into adjacent lanes. Ramp control: dynamic control of freeway on-ramp has been widely used and studied in many large cities abroad, and its control methods can be divided into dynamic coordinated control, single-point dynamic control and static control according to the control scope and complexity. Dynamic coordinated control and single-point dynamic control are mainly applied to the roads and ramps or interwoven areas with large traffic volume, and the dynamic allocation of traffic flow is realized by controlling the opening and closing of ramps. Vehicle type management and control: specific vehicle types are managed and controlled, including a speed limit, a driving lane, etc. Emergency lane control: according to the congestion level during peak period, accidents during off-peak period or other situations, by dynamically opening emergency lane (hard shoulder) as a lane, the road capacity can be improved to effectively relieve congestion.

It can be understood that according to the road conditions of large traffic volume, ultra-multi-lane and ultra-wide cross-section, the speed management and control strategy can enable drivers to respond quickly to the control strategy after being issued, and the immediate control effect of the speed strategy is better, so as to adapt to the need of expressway rapid control. Therefore, in the present embodiment, the speed strategy is set as the core target strategy of the optimization algorithm (adaptively adding other management and control strategies), and the optimization algorithm is configured for taking the current management and control section accident rate as the minimum and the section traffic efficiency per unit time as the optimization target, and outputting the speed management and control strategy associated with the vehicle type and lane according to the input risk and traffic flow data. Specifically, the above-mentioned optimization algorithm may be one of a genetic algorithm, a simulated annealing algorithm and a particle swarm optimization algorithm.

In a possible embodiment, a genetic algorithm is used as the optimization algorithm for this embodiment. It can be understood that when the era of large data comes, the magnitude of the data to be processed by the algorithm becomes larger and larger, and the scene of processing the problem becomes ever-changing. The general purpose of the optimization algorithm is to minimize the cost (such as money, time, various consumptions, etc.) of the whole process. Typical optimization algorithms include genetic Algorithm (GA), Tabu Algorithm (TS), Simulated Annealing Algorithm (SA), Particle Swarm Optimization Algorithm (PSO), Difference Algorithm (DE), Biogeographic Algorithm (BBO), and other. The typical optimization algorithms have been developed more mature, and applied in various optimization scenarios. However, in the scenario of traffic safety management and control, the space traffic flow is complex and the upstream and downstream traffic influence each other (parallel computing is required in the optimization calculation). Therefore, in this embodiment, the genetic algorithm adapted to the scene requirements is selected as the strategy optimization algorithm, which makes use of the strong global search ability of genetic algorithm and makes full use of the point value of each solution space, which is conducive to the advantages of parallel computing to achieve accurate and efficient mining of traffic safety management and control strategies.

Figure 5A:
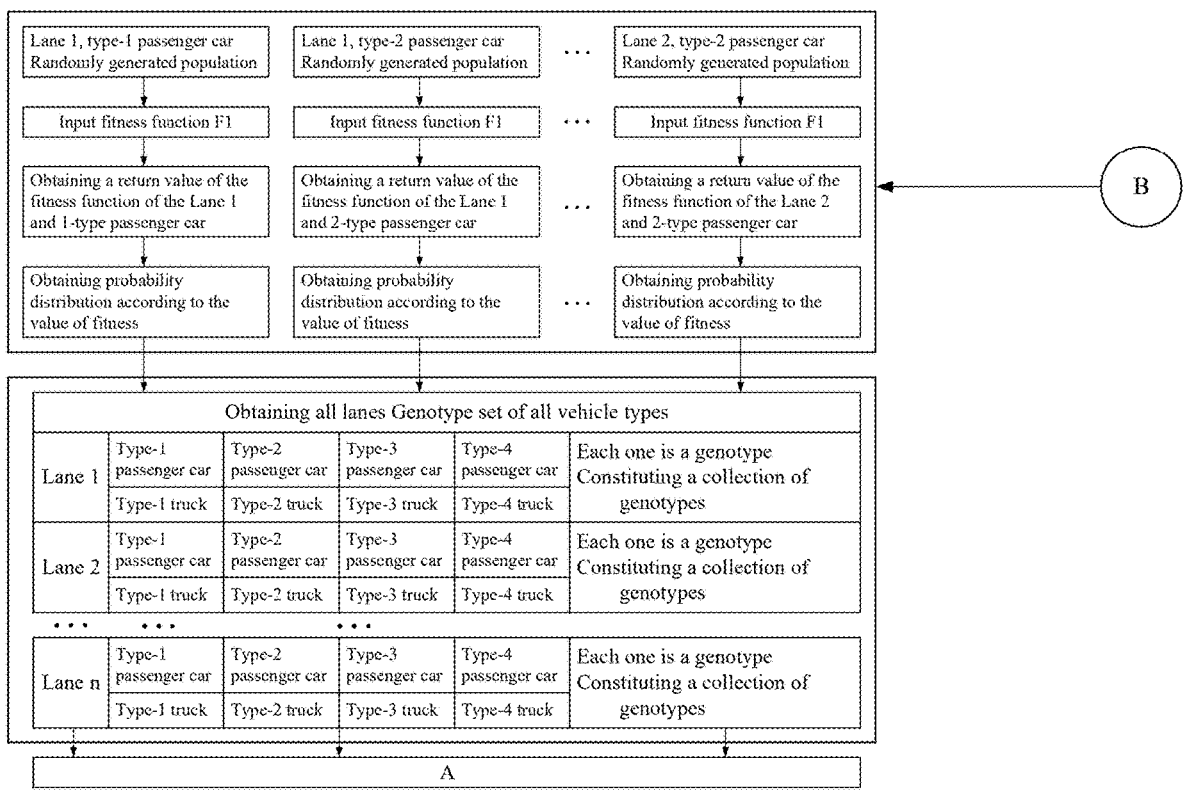
FIGS. 5A-B are a flow diagram of generating a management and control strategy by a genetic algorithm according to an exemplary embodiment of the present invention.
Figure 5B:
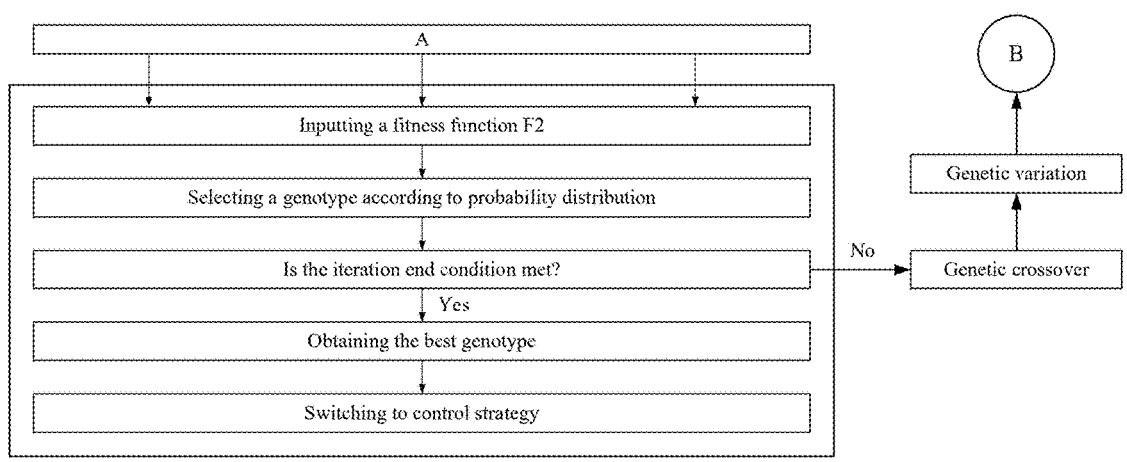

Specifically, the genetic algorithm optimization is composed of four parts: population genotype coding, fitness function determination, genotype cross mutation and determination of the end condition of iterative solution. As shown in FIG. 5, a class and a type of a vehicle allowed to enter the lane corresponding to the current management and control section, the control points and the layout of the data collection points are input into a genetic algorithm, and a strategy solution is performed for the genetic algorithm according to the following steps.

Step 101: the class and the type of the vehicle allowed to enter a lane in the current management section are determined. The vehicle categories are vans and passenger cars, and vans in the vehicle types can be divided into a type-1 truck, a type-2 truck, a type-3 truck and a type-4 truck. The passenger cars can be divided into type-1 passenger cars, type-2 passenger cars, type-3 passenger cars and type-4 passenger cars. It should be noted that in the present embodiment, the vehicle types are classified according to the "Car type classification for passage money of vehicle toll on toll road" (JT/T 489-2019), the specification classifies the passenger cars into four categories and the trucks into six categories, and the present embodiment classifies the trucks higher than the four-type trucks into the four-type trucks in a unified manner.

Figure 6:
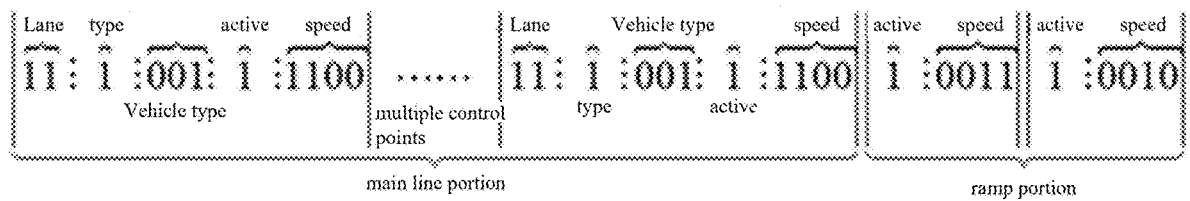
FIG. 6 is a schematic view of gene coding according to an exemplary embodiment of the present invention.

Step 102, according to the layout of control points and data collection points in the current management and control section, genotype coding is carried out on a certain type of vehicles allowed to enter a lane, and a corresponding genetic algorithm initial population is randomly generated. Herein the speed management and control strategy of a plurality of control points and data collection points of a certain type of motor vehicle allowed to enter in the lane in the whole management and control section is represented by the genotype code, as shown in FIG. 6.

Note that if the management section includes a ramp section, the ramp section code does not distinguish between the vehicle class and the vehicle type, and only limits the speed. Herein each management and control section comprises a plurality of control points. The genotype code of each main line control point comprises 11 bits, from left to right, and the first 2 bits are lane codes. The lane coding determines the number of coded bits according to the actual number of lanes, and the value of a lane is decimal converted into a corresponding binary value. The bit 3 is the type code of the vehicle, 1 is a truck and 0 is a passenger car. The bits 4-6 are vehicle type codes. According to the classification standard of highway vehicle type, the bus and the truck are divided into four categories, and the corresponding decimal value is expressed in binary in genotype. The bit 7 represents whether a control point is active, 1 is active, and 0 is inactive. The bits 8-11 represent the size of the speed control with a binary value corresponding to decimal and a resolution of 10 km/h.

Step 103, the initial population generated in step 102 and the road risk level obtained by the risk assessment module are input into a fitness function once to obtain a fitness value and ranking according to the size of the value.

Specifically, the primary fitness function of this step aims at minimizing the accident rate of a certain type of motor vehicle on one lane of the management and control section and maximizing the traffic efficiency per unit time.

Step 104, a plurality of genotypes corresponding to different vehicle types obtained in step 103 are sampled according to a probability distribution, taking the first 10% of the genotypes and discarding the last 90% of the genotypes.

Steps 102-104 are repeated to obtain a plurality of genotypes corresponding to all allowed vehicle types in a lane.

Step 105, the genotypes corresponding to different vehicle types of a lane obtained in step 104 are randomly sampled to obtain a lane genotype set. The lane genotype set contains all the genotypes of the lane that are allowed to enter the vehicle.

Specifically, in the case of random sampling, since one genotype corresponds to a control strategy of one vehicle type in one lane in one control section, the corresponding genotype can be sampled only once.

Step 106, the step 105 is repeated for obtaining a plurality of lane genotype sets as an initial population which is input into a quadratic fitness function to obtain a fitness value, and sort different vehicle type genotypes in different lanes according to the size of the value.

Specifically, the quadratic fitness function of this step aims at minimizing the accident rate and maximizing the traffic efficiency per unit time of all the vehicle types allowed to enter a lane on the control section.

Herein, the quadratic fitness function of step 106 can satisfy the traffic efficiency requirements of different vehicle types.

Step 107, the genotype with the best fitness obtained is selected by the last ranking in step 106, the same is converted into a control strategy of different vehicle types, and an iteration end condition is judged. If the iteration end condition is satisfied, the genotype is output as a control strategy of a road. If the iteration end condition is not satisfied, the present optimization steps 108-109 are continued.

Specifically, the iteration end condition is that the traffic flow per unit time actually collected by the present lane can completely pass within the unit time under the management and control strategy obtained through calculation.

Step 8, the first 10% of the genotypes in 106 are kept to perform gene crossover and mutation. The process of gene crossover can only be crossover between the same vehicle type, and the process of mutation can only perform mutation on the speed, so as to generate the initial population of the next round of optimization algorithm.

Step 9, the steps 103-107 are repeated until the end of iteration condition is met.

In step 1010, as of step 109, a management and control strategy for all the allowed vehicle types in one lane is formulated, and steps 101-109 are repeated to formulate a management and control strategy for the allowed vehicle types in all the lanes actually operated by the road, and a management and control strategy is obtained for all the allowed vehicle types in all the lanes of one management and control section.

Step 1011, the steps 101-1010 are repeated for different management and control sections to obtain a lane-division and vehicle-division type speed management and control strategy for all the management and control sections;

In a possible embodiment, the primary fitness function in S103 above is as follows:

$$f_1(x) = \begin{cases} C_{jk1}(v_{jki}) = \sum_{i=1}^{i=n} \dfrac{\dfrac{99.7488}{v_{jkf}^4}v_i^4 - \dfrac{199.4976}{v_{jkf}^3}v_i^3 + \dfrac{128.6364}{v_{jkf}^2}v_i^2 - \dfrac{28.8876}{v_{jkf}}v_i + 2.7091}{n} \\ C_{jk2}(\Delta v_{jki}) = \sum_{i=1}^{i=n} \dfrac{0.498 \times e^{\Delta v_i}}{n-1} \\ C_{jk3}(\delta) = -35.472 + 16.435\ln(\delta) \\ C_{jk4} = 0.2C_1(v_{jki}) + 0.2C_2(\Delta v_{jki}) + 0.6C_3(\delta) + \beta \\ t_{jki} = \sum_{i=1}^{i=n} \dfrac{L_i}{v_{jki}} \\ T_{jk} = \sum_{i=1}^{i=n} t_i \end{cases} \quad (1)$$

where $C_{jk1}(v_i)$, $C_{jk2}(\Delta v_i)$ and $C_{jk3}(\delta)$ are the accident rate of a j lane vehicle type k of a management and control section; $v_{jki}$ is the cross-section speed of a collection point of the j lane k vehicle type of the management and control section; $v_{jkf}$ is the free flow speed of the j lane k vehicle type; $\delta$ is the standard deviation of the speed of the management and control section; n is the number of control points of the management and control section; and $\beta$ is the risk level, wherein the accident rate increases by 1 million kilometers per increase of the risk level. $C_{jk4}$ is the total accident rate of the management and control section. $L_i$ is the length of the road covered by each control point in the management and control section; $t_{jki}$ is the time required for the motor vehicle to move out of the control point of the management and control section; and $T_{jk}$ is the time required for the motor vehicle to move out of the management and control section.

The solution of the above-mentioned primary fitness function needs to satisfy the minimum accident rate and the minimum transit time, i.e. the non-dominated solution of the solution set composed of the value of $C_{jk4}$ and the value of $T_{jk}$.

In a possible embodiment, the quadratic fitness function in S106 above is as follows:

$$f_2(x) = \begin{cases} C_1(v_{jki}) = \dfrac{\sum_{j=1}^{j=l}\sum_{k=1}^{k=p} C_{jk1}(v_{jki})}{l+p} \\ C_2(\Delta v_{jki}) = \dfrac{\sum_{j=1}^{j=l}\sum_{k=1}^{k=p} C_{jk3}(v_{jki})}{l+p} \\ C_3(\delta) = \dfrac{\sum_{j=1}^{j=l}\sum_{k=1}^{k=p} C_{jk3}(v_{jki})}{l+p} \\ C_4 = 0.2C_1(v_i) + 0.2C_2(\Delta v_i) + 0.6C_3(\delta) \\ t_c = \sum_{j=1}^{j=l}\sum_{k=1}^{k=p}\sum_{i=1}^{i=n} \dfrac{L_i}{v_{jki}} \\ T = \sum_{i=1}^{i=l+p+n} t_c \end{cases} \quad (2)$$

where $C_1(v_{jkl})$, $C_2(\Delta v_{jkl})$ and $C_3(\delta)$ are the accident rate of all lanes and vehicle types covered by each control point of the management and control section, and $C_4$ is the total accident rate of the management and control section. $t_c$ is the time when each control point of the management and control section covers all the lanes and vehicle types leaving the control point of the management and control section. T is the time when each control point of the management and control section covers all the lanes and vehicle types leaving the control point of the management and control section.

The solution of the above-mentioned quadratic fitness function needs to satisfy the minimum accident rate and the minimum transit time, i.e. the non-dominated solution of the solution set composed of the value of $C_4$ and the value of T.

In a possible embodiment, the iteration termination condition function in the S107 described above is as follows:

$$f_3(x) = \begin{cases} Q_m = Q_s + Q_y \\ T_s = t_m \end{cases} \quad (3)$$

where $Q_s$ is the cross-section traffic volume in the time window of time $T_s=t_m$ collected by the present system; and $Q_y$ is a value expected to increase the traffic volume after the implementation of the management and control measures by algorithm optimization, and is the predicted traffic flow data of the next time window in the presence of a traffic accident. $Q_m$ is a simulated traffic input amount of T time entered into the traffic simulation software.

In particular, when $Q_m$ it is possible to completely pass through in time $T_s$, the genetic algorithm iterative optimization is ended, the optimal genotype is output and converted into a corresponding control road segment control strategy. When it is not possible to pass completely through in time, the genetic algorithm iteration continues.

In a possible embodiment, in S2 above, the traffic flow prediction model is constructed in advance based on the modified TST model, wherein the modified TST model is a TST model added with a position vector encoding layer and a multi-headed attention mechanism layer; and the position vector encoding layer and the multi-headed attention mechanism layer are configured for performing time sequence information modeling on an input vector.

It can be understood that in the art, with regard to a traffic time sequence prediction scene, a common prediction model is a LSTM model or an improved model based on the LSTM model. However, the existing model has the problems of low accuracy and poor applicability. Therefore, in the present embodiment, an improved Transformer (TST) model is established, wherein the model uses an attention mechanism and a position vector to capture a long-term of time sequence data, allows information to be propagated in a longer sequence, can be adapted to short-term prediction, and can effectively improve the application performance of the model.

Figure 7:
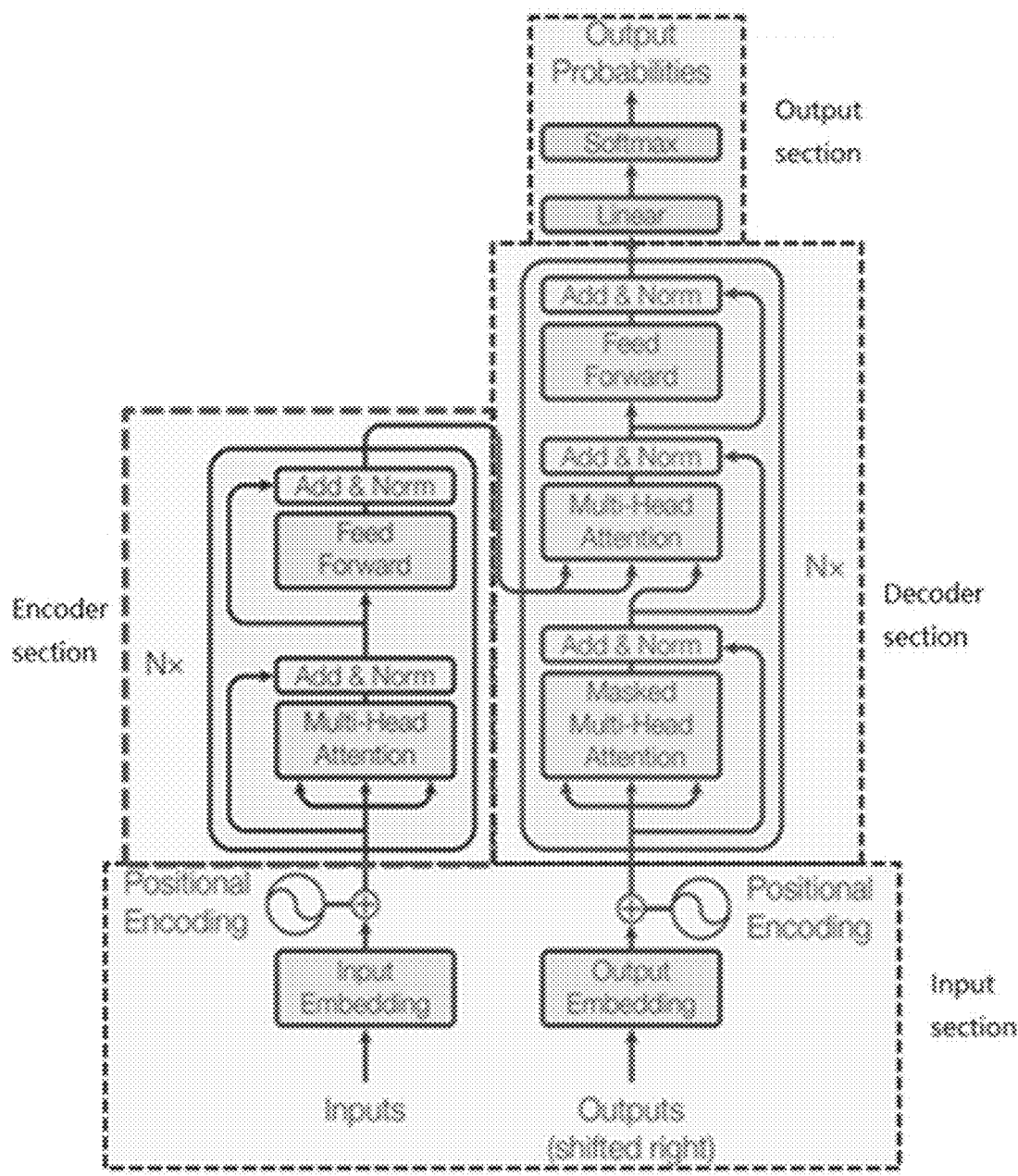
FIG. 7 is a schematic view of a classical Transformer model architecture.

In particular, FIG. 7 shows a classical Transformer model, the overall model comprising four parts: an input, an output, an encoder and a decoder. Herein, the input part comprises a source data embedding layer and a position encoder thereof, and a target data embedding layer and a position encoder thereof. The output part comprises a linear layer and a Softmax layer, and the encoder and the decoder are respectively composed of a plurality of sub-layer connection structures.

Figure 8:
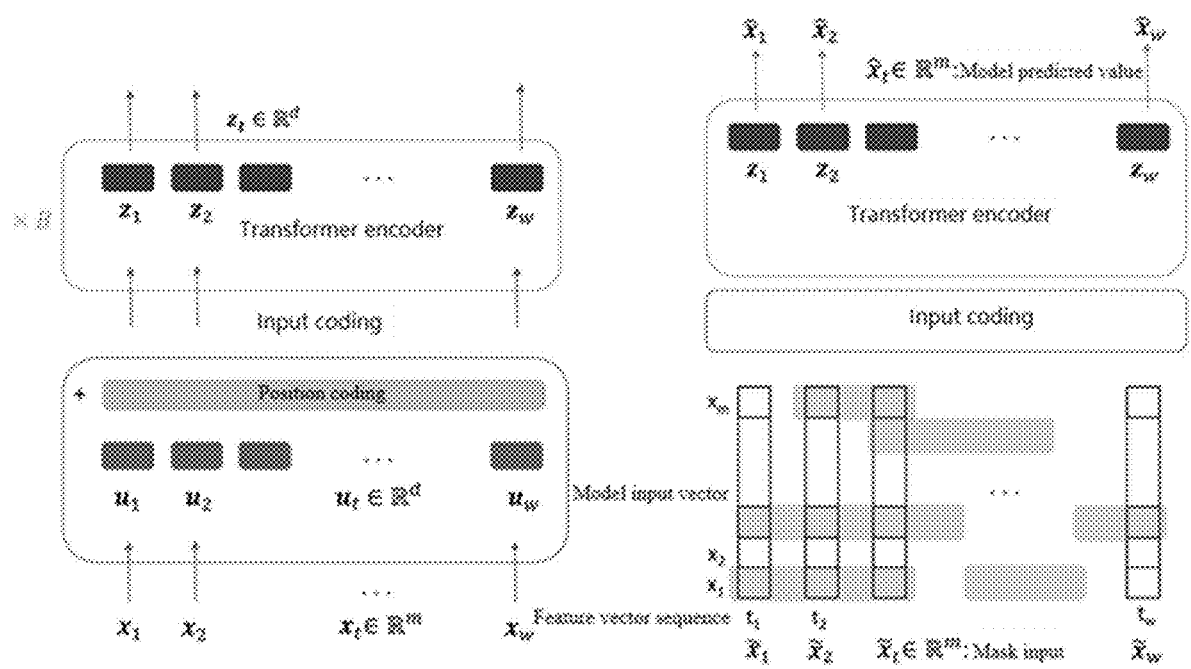
FIG. 8 is a schematic view of a modified TST model architecture according to an exemplary embodiment of the present invention.

In this embodiment, the core of the modified TST model used is the stack of encoders, each encoder layer completes a feature extraction process for input data, and the TST model removes the decoder part of the previous classical Transformer model and redefines the other parts of the model. A schematic view of the framework of the model part is shown in FIG. 8, and each part is described in detail later.

In this model, the attention mechanism and the position vector are used to capture the long-term dependence of time series data, which allows information to be spread in longer time series. This model has been applied to feature extraction and time series anomaly detection, and some researches have tried to improve the classical Transformer model for short-term traffic flow prediction. However, due to the comprehensive reasons of time series data acquisition and model application, TST model has not been fully applied in the field of short-term speed prediction.

(1) Input Part

The length of each training sample time series is W, and the feature vector sequence $x_t \in R^w = [x_1, x_2, \ldots, x_w]$ is composed. The original feature vector $x_t$ is normalized by the Z-Score method, and then mapped to d-dimensional space by high-order feature extraction. That is, $$u_t = w_p x_t + b_p \quad (4)$$

In the above formula, $w_p \in R^d$, $b_p \in R^d$ are all the parameters that can be learned by the model; and $u_t \in R^d$, t=0, ..., w are model input vectors, which will enter the multi-head self-attention sub-layer by position coding. It can be seen that the original temporal slice dimension mapping becomes d, also referred to as a hidden feature.

(2) Position Coding

In order to enable the model to model the timing information, a position code $W_{pos}$ is added to the input vector $U \in R^{w \times d} = [u_1, u_2, \ldots, u_w]$, namely:

$$U' = U + W_{pos} \quad (5)$$

At present, the commonly used position codes are respectively trigonometric function position codes and learning position codes. The latter breaks the model position invariance and performs better on the existing data set. Therefore, this embodiment uses the learning position code.

(3) Multiple Attention Mechanism

The mathematical expression for the attention mechanism is as follows, where $Q \in R^{w \times d_k}$, $K \in R^{w \times d_k}$, and $V \in R^{w \times d_v}$ represent queries, keys and values in the attention mechanism, respectively.

$$\text{Attention}(Q, K, V) = \text{softmax}(QK^T / \sqrt{d_k})V \quad (6)$$

In this embodiment, a multi-head attention mechanism is used to perform time sequence modeling, and the calculation formula thereof is as follows:

$$\text{MultiHead}(Q, K, V) = \text{Concat}(h_1, h_2, \ldots, h_m)W^o \quad (7)$$

$$h_i = \text{Attention}(QW_i^q, KW_i^k, VW_i^v) \quad (8)$$

where $$W_i^q \in R^{d \times d_k}, W_i^k \in R^{d \times d_k}, W_i^v \in R^{d \times d_k}$$

and $W^o \in R^{md_v \times d}$ are learnable model parameters and m is the first number of multi-headed attention mechanisms.

Each time-sequential segment may be of different length. Thus, the maximum sequence length w is used in the model and short samples are filled with arbitrary values. Before computing the self-attention distribution, the Softmax function is used to generate a padding mask that adds a large negative value to the padding position, which allows the model to ignore the padding bit value while allowing parallel processing of short sequence fragment data.

In the NLP model, the Layer Normalization is typically used after computation of the multi-headed self-attention sublayer and the feed-forward full connectron layer. In order to reduce the influence of outliers, in the present embodiment, batch Batch Normalization is used for the modified TST model (Text Style Transfer network model) provided in the embodiment of the present application, which may also have the effects of alleviating gradient disappearance/explosion, accelerating training and regularization.

In a possible embodiment, in the above-mentioned active management and control method for road traffic safety, as shown in FIG. 9, the pre-constructing the traffic flow prediction model based on a modified TST model comprises the following steps.

The historical traffic flow data corresponding to a target road is acquired, and a plurality of data sample vectors are extracted from the historical traffic flow data based on the pre-set time window.

A plurality of the data sample vectors are standardized by using a Z-Score method, and a modified TST model is trained on the basis of a plurality of the first data sample vectors.

After the modified TST model satisfies the condition convergence, the trained modified TST model is taken as the traffic flow prediction model.

Specifically, all the vehicle time sequence data (second level) of the obtained highway main line section are sorted out, and the original time sequence data is divided into a set of multiple time sequence segments by means of a sliding window. Each vehicle randomly selects 70% of the time-series segment data as the training set and 30% of the time-series segment data as the test set. After the data is standardized, the data of each vehicle in each lane is trained and tested by using the constructed TST model. Finally, the error is analyzed and the model is saved.

In a possible embodiment, the training of the modified TST model comprises the following steps. The modeladam is optimized by the algorithm. The model generalization is further improved by Dropout. The learning rate annealing algorithm is used to find the optimal learning rate of model convergence, and GELU is selected as the activation function. Compared with the results, the learning rate parameter value, batch size, iteration number, sliding window size and sliding window step size can be achieved.

In the present embodiment, multiple attempts are made on model construction and training super-parametric optimization with regard to scenario, and finally a high-precision vehicle time-series traffic flow prediction model suitable for all lanes provided by the present application is constructed.

In a further embodiment of the present invention, in order to evaluate and verify the accuracy of the established lane-level driving speed prediction model, the average absolute error (MAE) and relative error (MAPE) indexes are used to evaluate the prediction accuracy of the model. The calculation formula is as follows:

$$MAE = \frac{1}{n}\sum_{i=1}^{n}|y_i - y_1| \quad (9)$$

$$MAPE = \frac{1}{n}\sum_{i=1}^{n}\frac{|y_i - y_1|}{y_i} \quad (10)$$

MAE can directly reflect the deviation between the true value and the predicted value; and MAPE refers to the percentage of error in the true value, which can reflect the predicted error level and credibility. In the above equation, $y_i$ and $y_1$ are the actual speed at the i time and the predicted speed, respectively. n is the total number of predicted values.

Figure 9A:
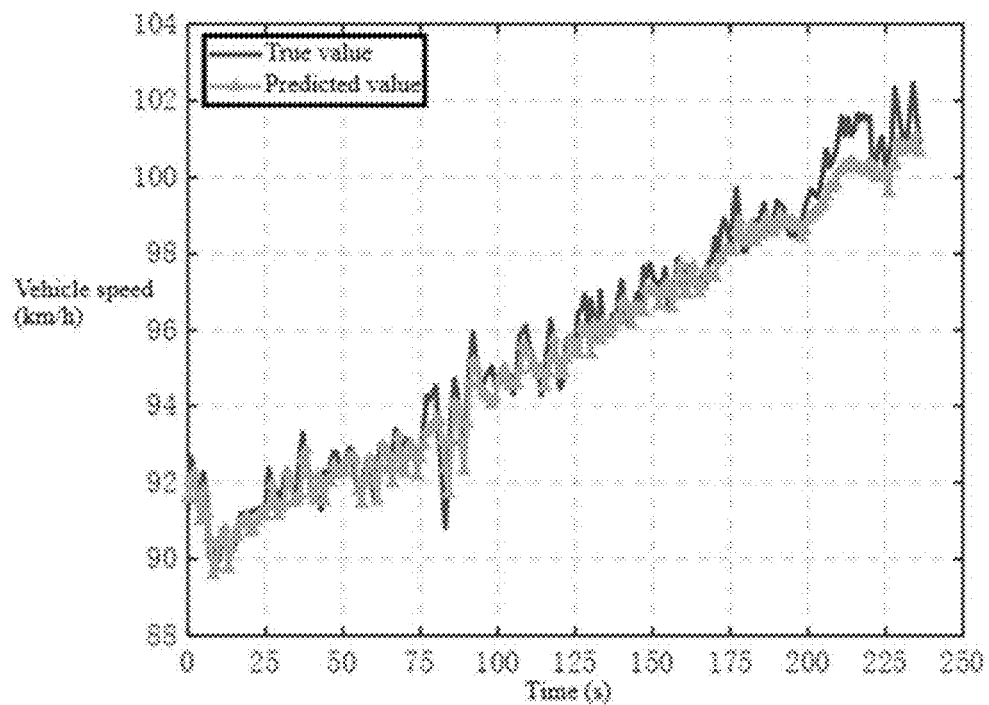
FIG. 9A is a schematic view 1 showing prediction effects of a modified TST model according to an exemplary embodiment of the present invention.
Figure 9B:
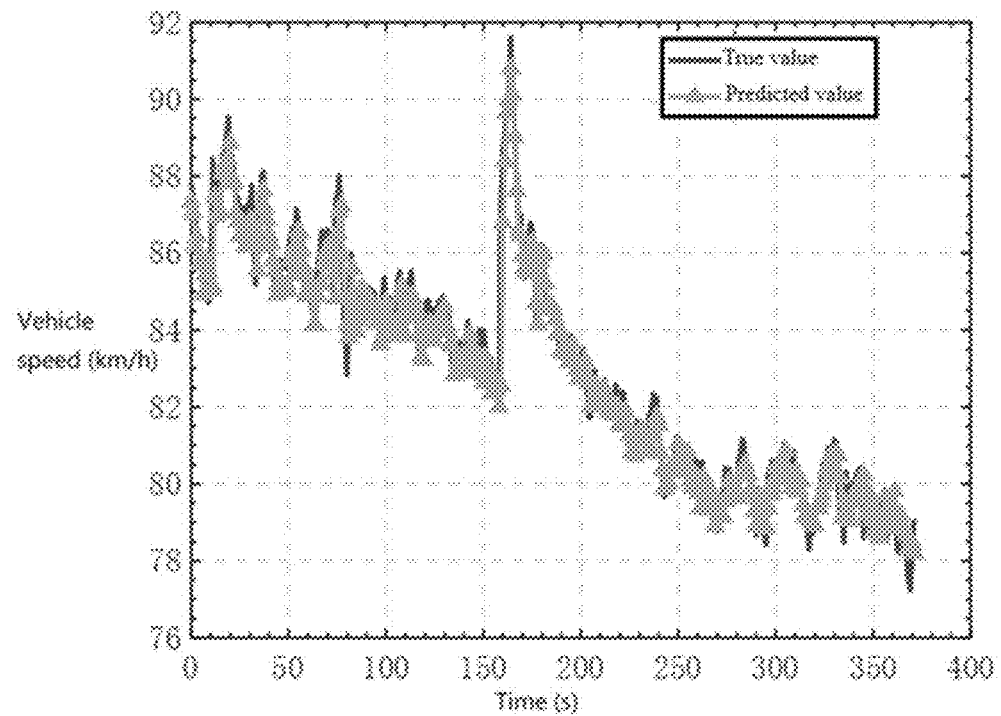
FIG. 9B is a schematic view 2 showing prediction effects of a modified TST model according to an exemplary embodiment of the present invention.
Figure 10:
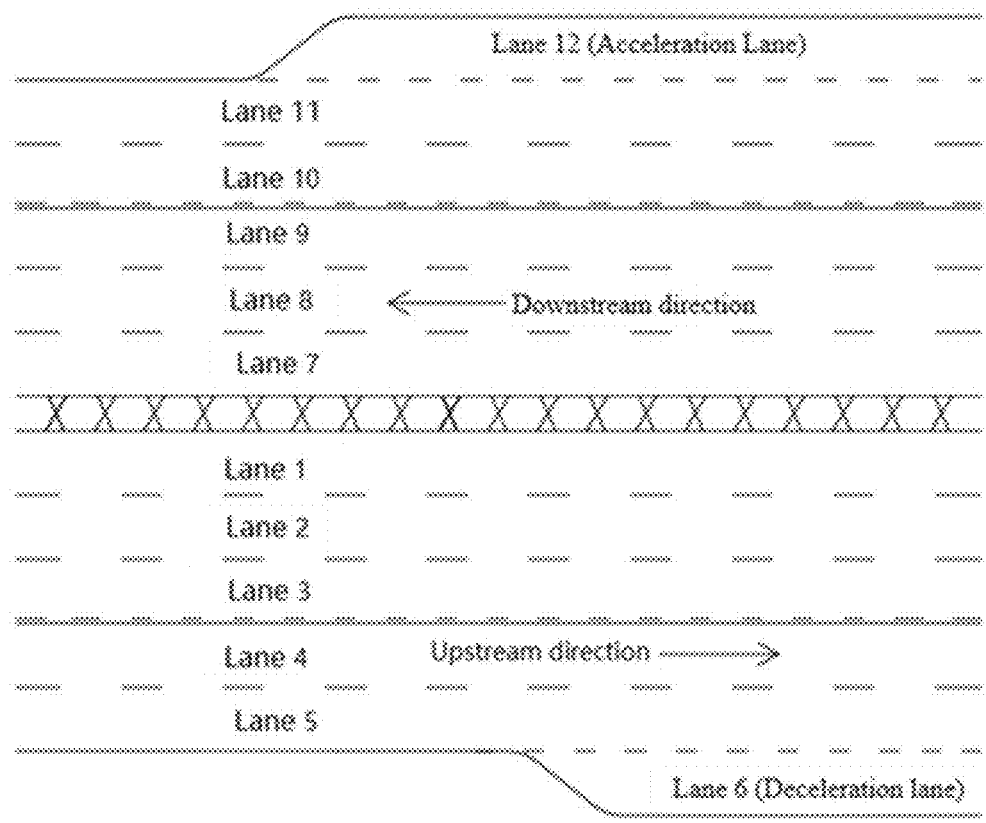
FIG. 10 is a schematic view of a highway for verifying model performance according to an exemplary embodiment of the present invention.

FIGS. 9A-9B are graphs showing the prediction results of the modified TST model used in the present embodiment when driving at the highway interchange lane level as shown in FIG. 10. It can be seen from the graphs that the prediction accuracy of the modified TST model used in the present embodiment can reach 98.35%, the prediction accuracy is high and the prediction effect is good. The prediction results of two vehicles in one lane and two lanes are illustrated as follows.

Figure 11A:
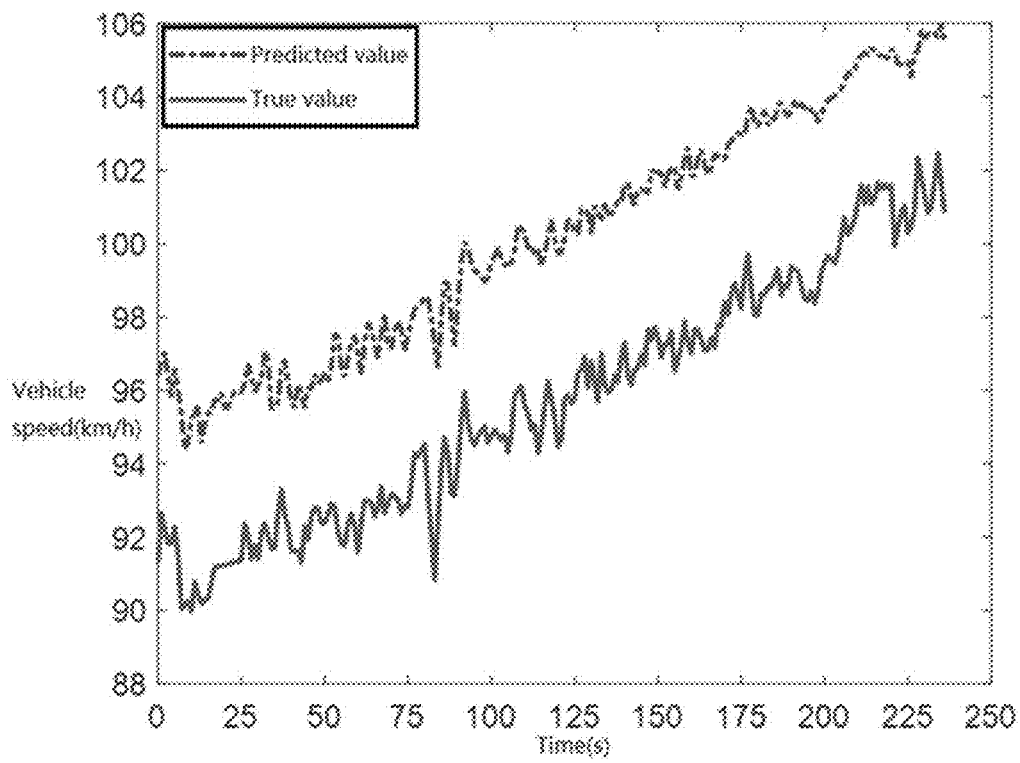
FIG. 11A is a schematic view 1 showing prediction effects of the LSTM model according to an exemplary embodiment of the present invention.
Figure 11B:
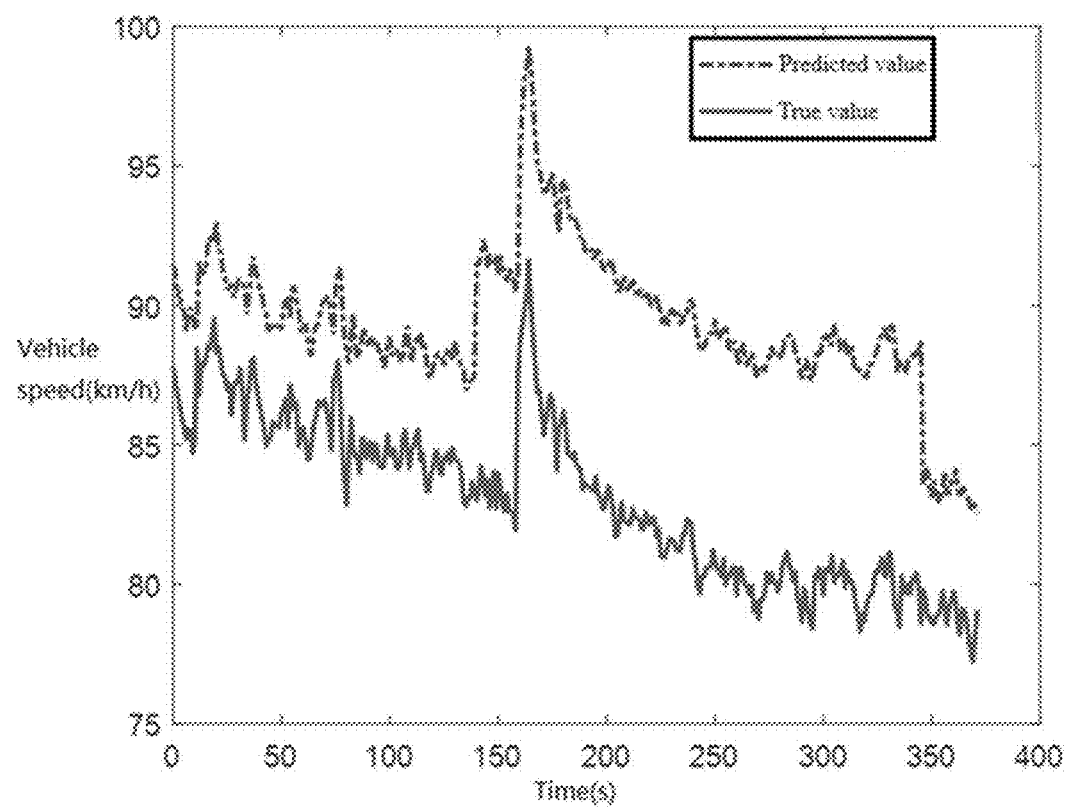
FIG. 11B is a schematic view 2 showing prediction effects of the LSTM model according to an exemplary embodiment of the present invention.

FIGS. 11A-11B show the prediction results of the highway shown in FIG. 10 using a LSTM model commonly used in the art. It can be seen from the Fig. that the prediction accuracy rate of the LSTM model can reach 95.21%, and it can be seen by comparing two vehicles in lane 1 and lane 2 that the average absolute error of the model proposed by the modified TST model used in the present embodiment is smaller.

In a possible embodiment, the above-mentioned first pre-set time period is 5 min. By acquiring real-time traffic flow data of each period, the traffic flow of the road section is predicted using the above-mentioned established model. The time sequence speed in the above-mentioned model corresponds to 5 min traffic flow, time sequence traffic flow data is established, and the predicted traffic flow data of the next period is obtained by processing.

In a possible embodiment, in S2 described above, the traffic risk prediction model is constructed in advance by a method including: acquiring historical traffic data and historical event data thereof corresponding to a target road, and determining a plurality of target risk level intervals based on the historical traffic data and the historical event data thereof; constructing a plurality of data sample vectors based on the historical traffic data, and performing normalization processing and risk level marking on the data sample vectors based on the plurality of target risk level intervals; and training a convolution neural network by the marked data sample vector, and after the convolution neural network satisfies condition convergence, taking the trained convolution neural network as the traffic risk prediction model.

Figure 12:
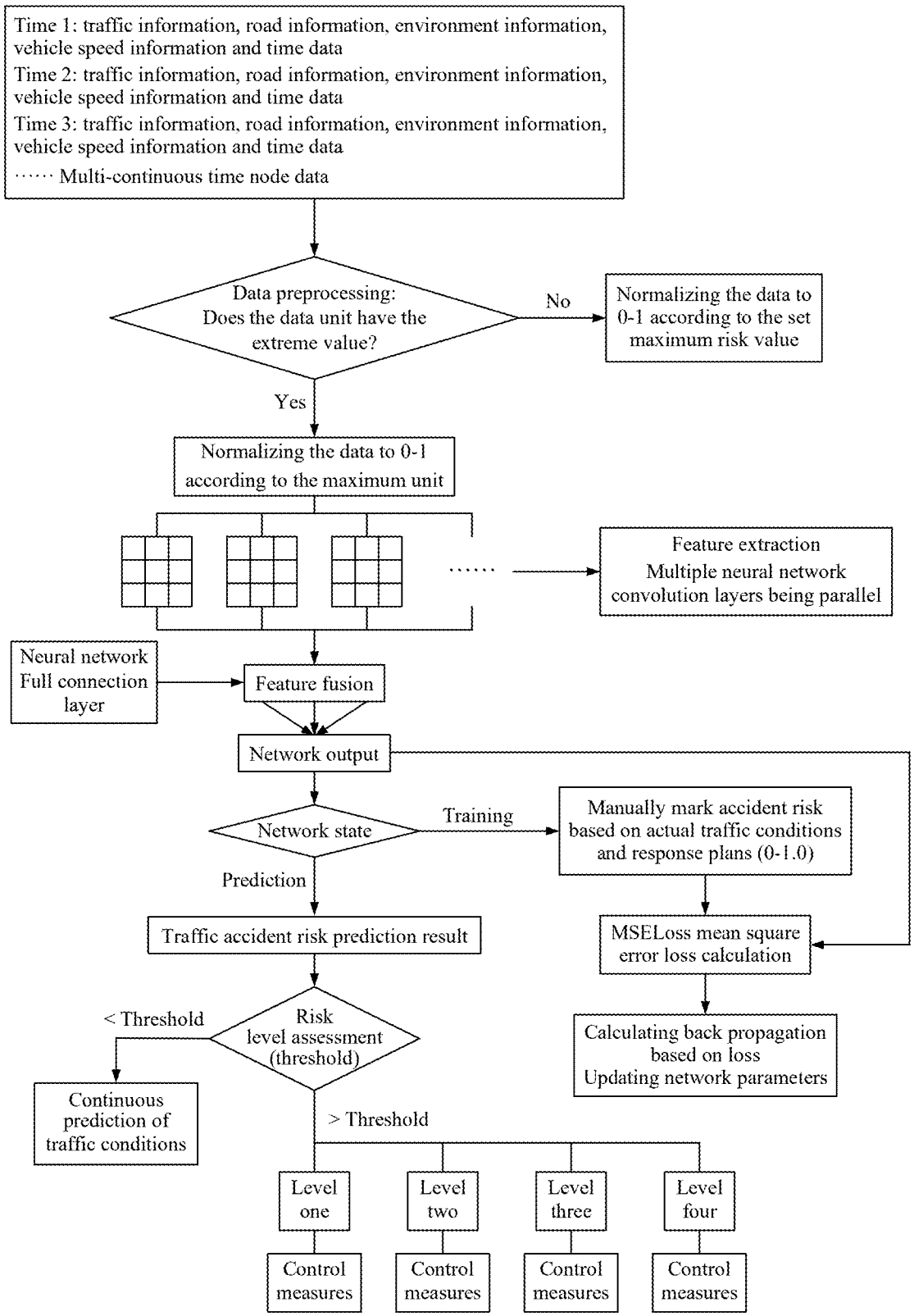
FIG. 12 is a schematic flow diagram of a pre-built accident risk prediction model according to an exemplary embodiment of the present invention.

FIG. 12 shows a principle flowchart of the traffic risk prediction model. Specifically, the risk prediction model provided in the present embodiment collects 28 items of data of 7 dimensions including road information, environment information, traffic flow information, vehicle speed information, poor traffic behavior, vehicles, and time, and predicts the probability of accidents and the number of accident vehicles using a convolution neural network method based on traffic flow sequences. Specifically, Table 1 shows inputs of the model, and outputs of the model are a road risk level and a road risk coefficient.

TABLE 1

| Model Inputs | | | | |
|---|---|---|---|---|
| Road information | Environmental information | Vehicle speed information (per lane) | Traffic flow information | Bad traffic behavior (per lane) |
| Pavement moisture | Visibility | Average speed | Large-vehicle proportion | Parking |
| Pavement flatness | Rainfall | Peak speed | Cross-sectional flow | Too close to vehicle following |
| Number of lanes | Snowfall | Minimum speed | | Overspeed |
| Coefficient of friction | Humidity | Maximum acceleration | | Low speed |
| Curve radius | Wind speed | Maximum deceleration | | Retrograding |
| Longitudinal slope | Temperature | | | Illegal lane change |
| Mountainous area | | | | |
| Plain | | | | |

Specifically, since traffic events have the characteristics of time consistency, the model collects data of each dimension at a certain time to form a sequence as input data. Since each data unit and span is different, and the data with larger numbers is weighted more, all the data is normalized and preprocessed as the input of the model. For the input with maximum value, such as week and time (24H), it is feasible to directly normalize to 0~1. For the input without maximum value or minimum value, such as maximum vehicle speed, it is considered that if the speed exceeds 150 km/h, it is a rather dangerous behavior, the maximum risk has been reached. Therefore, the speed between 0-150 will be normalized to 0-1, directly to 1 when the speed is over 150. These maximum risk values are established by traffic experts.

Multi-channel convolution layer is used by the model to extract features, and multiple large kernel neural networks are convolved in parallel and extracted for features respectively. Using a large convolution kernel, a larger range is covered, a receptive field is larger, and a larger range of features is perceptible during convolution. Multi-kernel extraction of each extracted feature is equivalent to multi-model parallel, and the extracted features are more perfect and diversified. After splicing the features of multiple channels, the neural network full connection layer is used for feature fusion, so that the final prediction probability and each extracted feature are associated, and finally traffic accident risk is comprehensively predicted.

In the network training, since there are much more data than the accident data in the security, in order to meet the balance of the accident, we will choose a small sample size. For the training data, there is a higher proportion of accident data, which improves the reliability of the model. When marking, according to the actual situation of road accident, the four-level accident risk and treatment scheme and the corresponding risk threshold (0-1) of each scheme are set in advance. According to the actual traffic accident situation and the severity of the start-up scheme, the accident scheme level set in advance is used to manually mark the risk coefficient.

In calculating the accuracy of the model, i.e., the loss calculation, the commonly used mean square error loss calculation (MSELoss) for regression problems is used to measure the difference between the predicted probability and the true probability. According to network prediction, true label and loss, the gradient back-propagation is performed to update network parameters and narrow the gap between network prediction probability and true probability, so that the model prediction is more accurate.

The model predicts the risk of the accident, and classifies the risk into four levels, No risk. Level one, Level two, Level three, Level four, according to the threshold. According to the predicted risk level, traffic flow should be guided and controlled in advance to avoid accidents as much as possible, and police and medical personnel should be mobilized according to the scale of accidents to ensure the personal and property safety of traffic participants.

The model provided in this embodiment avoids the subjectivity and incompleteness of manually setting weights compared with the traditional weighted prediction algorithm. Compared with the BP network, the number and depth of network channels are larger. The increase in network depth is equivalent to a greater network complexity, a greater network prediction and expression ability, and an increase in the number of network channels, wherein a plurality of neural network convolution layers are in parallel and extract features respectively, which is equivalent to a plurality of models being in parallel, and finally a prediction result is comprehensively calculated.

Compared with the traditional convolution network, the accident risk prediction model provided by the present embodiment inputs continuous time data, considers the time correlation between the data, and is more suitable for traffic application scenarios. Since each data unit and span is different, the data with larger number is weighted more. Therefore, the normalized preprocessing of all data can better fuse all dimensional data. Compared with the traditional convolution network, the input information has been selected, which is equivalent to data preprocessing and no redundant information. Thus, the speed is faster. The network adopts common operators, has high parallelism, and is easy to deploy on the edge computing side. The equipment is deployed on the road test, and the prediction results can be obtained quickly to manage and control vehicles. More and more hardware devices (computers, edge-side, mobile-side) support hardware acceleration of neural networks, increase the parallelism of computing and device utilization, and make network reasoning faster. The network is easily deployed at the edge computing side. Only the prediction results need to be sent to the command center to reduce transmission costs, reduce server computing and storage pressure, so that the server can make unified decision. Moreover, the edge computing device itself has the advantages of low price, low power consumption and easy deployment.

Figure 13:
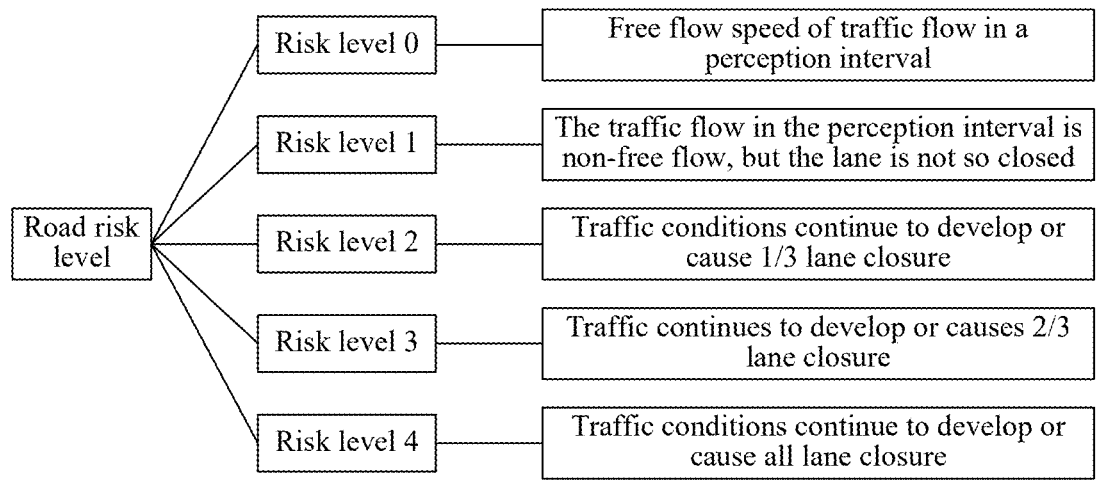
FIG. 13 is a schematic view of road risk classification according to an exemplary embodiment of the present invention.

Specifically, a training data set of the above-mentioned risk prediction model is constructed by the following method. As shown in FIG. 13, a road risk level is divided in advance, and historical traffic flow data of a road is collected multiple times with 5 min as a data collection window length based on an actual project. By analyzing the historical data, we obtain the data that the road visibility is greater than 300 meters, there is no snow and ice accumulation, and there is no abnormal driving behavior of the driver. The data is traffic flow data of a unit time window in which the traffic flow is free flow, and a plurality of free flow traffic flow data constitute a data set with a risk level of 0. Based on this, the present embodiment constructs data sets for other risk levels.

The traffic flow data includes traffic flow data output by the simulation software, and time-series vehicle speed change data per motor vehicle and lane time-series change data.

Different vehicle speed limits under the different road conditions are shown in the following table.

TABLE 2

| Speed limit of different road conditions | | | |
|---|---|---|---|
| Road visibility (meters) | Road snow (mm) | Road icing (mm) | Vehicle speed (km/h) |
| <300 | <5 | <2 | 80 |
| <200 | <10 | <4 | 60 |
| <100 | <15 | <6 | 40 |
| <50 | >20 | >6 | 20 |

Figure 14:
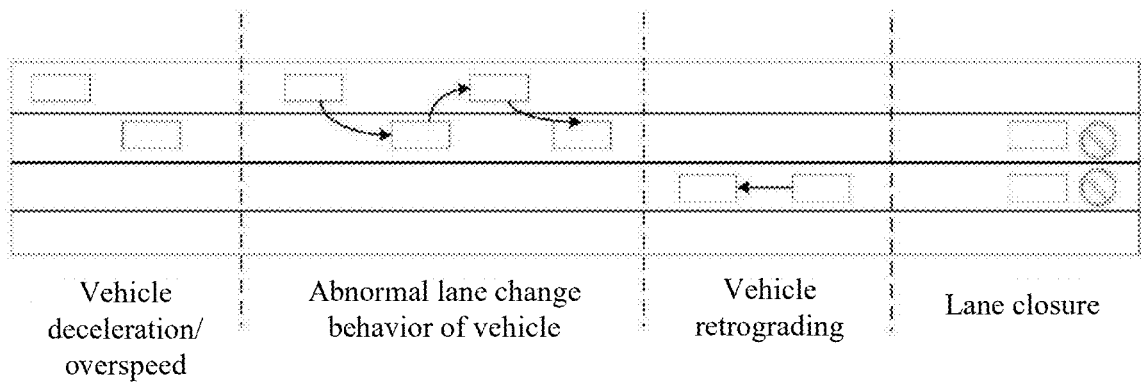
FIG. 14 is a schematic view of a traffic event simulation and emulation according to an exemplary embodiment of the present invention.

As shown in FIG. 14, by secondary development of the traffic simulation software, one or more vehicles are controlled to generate different traffic events, and traffic flow data of the entire road area is collected when the traffic events are generated. By controlling the vehicle to stop in the lane, a closed lane condition resulting from the occurrence of a traffic event is simulated.

Specifically, when constructing a data set with a road risk level of 1, a combination of a certain traffic event and a road condition is exhaustively enumerated, which is converted into traffic simulation software input parameters and data-structured collection of traffic flow is performed. A data set at a road risk level of 1 is obtained.

Preferably, when constructing a data set with a road risk level of 2, in addition to requiring an exhaustive enumeration of a combination of a certain traffic event and a road condition to convert it into a traffic simulation software input parameter, a partial road closure condition is simulated by exhaustive enumeration of all lanes of the current road and controlling one or more vehicles to stop on one third of the total number of lanes due to the current traffic event, respectively. In this whole process, the traffic flow data is collected in structuralization. A data set at a road risk level of 2 is obtained.

Preferably, when constructing a data set with a road risk level of 3, it is necessary to exhaustively enumerate a combination of a certain traffic event and a road condition, convert same into input parameters of a traffic simulation software, exhaustively enumerate all lanes of the current road and control one or more motor vehicles to respectively stop on lanes with ⅔ of the total number of lanes because of the current traffic event, thereby simulating a partially closed road condition. In this whole process, the traffic flow data is collected in structuralization. A data set at a road risk level of 3 is obtained.

Preferably, when constructing a data set with a road risk level of 4, it is necessary to exhaustively enumerate a combination of a certain traffic event and a road condition, convert same into input parameters of a traffic simulation software, exhaustively enumerate all lanes of the current road and control one or more motor vehicles to respectively stop on all lanes because of the current traffic event, thereby simulating a fully closed road condition. In this whole process, the traffic flow data is collected in structuralization. A data set at a road risk level of 4 is obtained.

Specifically, as shown in FIG. 14, a data set with a road risk level of 1 is constructed by collecting traffic flow data satisfying non-accident, non-free flow conditions in historical traffic data. Preferably, when a data set with a road risk level of 2 is constructed, the data which causes the number of lane closures to reach ⅓ of all lanes in the historical accident data is collected to obtain a data set with a road risk level of 2. Preferably, when a data set with a road risk level of 3 is constructed, the data which causes the number of lane closures to reach ⅔ of all lanes in the historical accident data is collected to obtain a data set with a road risk level of 3. Preferably, when a data set with a road risk level of 4 is constructed, the data resulting in closure of all lanes in the historical accident data is collected to obtain a data set with a road risk level of 4.

In a possible embodiment, if traffic event data is not acquired on the target road (e.g., a new road), the accident risk model may be pre-constructed using two methods below.

1. The road-like scenes around the road are used instead, the initial model is established by simulation, and the parameters of the risk prediction model are modified after the event data is accumulated.
2. The traffic conflict data of the road section (such as the relative distance of two vehicles divided by the speed difference, urgent braking data and urgent deceleration data) is collected. The traffic conflict represents the safety level of the road section traffic flow to establish a corresponding relationship between the traffic conflict and the traffic flow risk.

Further, the above-mentioned active management and control method for road traffic safety further comprises S4 that, after the corresponding active management and control strategy is generated, the corresponding active management and control strategy is generated to the remote control center system, so that the remote control center system issues the strategy in the information network.

Example 3

Figure 15:
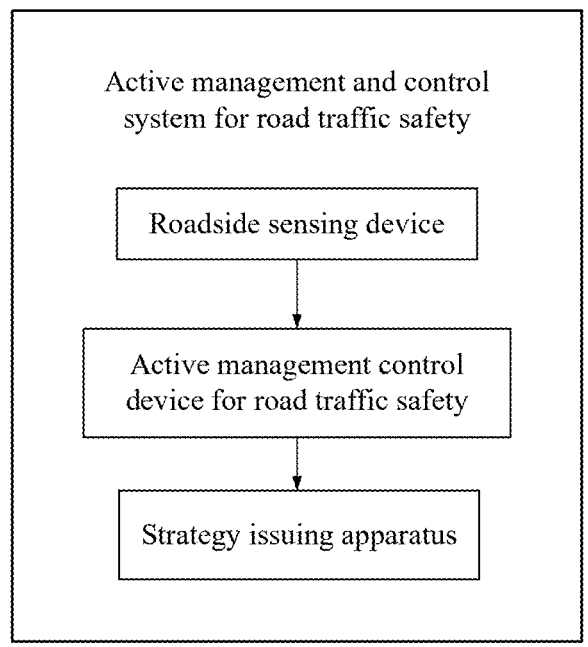
FIG. 15 is a schematic view of an architecture of an active management and control system for road traffic safety according to an exemplary embodiment of the present invention.

In another aspect of the present invention, as shown in FIG. 15, an active management and control system for road traffic safety is provided, comprising:

a roadside sensing apparatus configured for acquiring real-time traffic data of a target road and transmitting same to an active road traffic safety management and control device, wherein the roadside sensing apparatus is disposed at intervals in a plurality of management and control sections of a target road;

an active management and control device for road traffic safety configured for generating an emergency management and control strategy or an active management and control strategy of the target road by the active management and control method for road traffic safety of the above-mentioned Example 1 or Example 2, and outputting same to a strategy issuing apparatus; and a strategy issuing apparatus disposed at intervals in a plurality of management and control sections of the target road for visually presenting the emergency management and control strategy or the active management and control strategy.

In a possible embodiment, in the above-mentioned active management and control system for road traffic safety, a plurality of the monitoring modules comprise a radar, a camera and a lidar and camera integrated machine.

In a possible embodiment, in the above-mentioned active road traffic safety management and control system, the strategy issuing apparatus comprises a variable information board and a V2X device.

Figure 16:
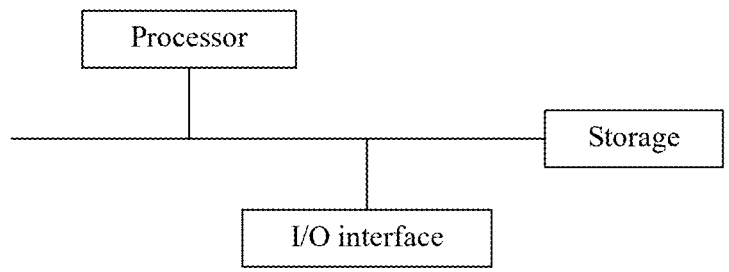
FIG. 16 is a schematic view of a hardware architecture of an active management and control device for road traffic safety according to an exemplary embodiment of the present invention.

In a possible embodiment, as shown in FIG. 16, the hardware carrier of the above-mentioned active management and control device for road traffic safety is an electronic device. The electronic device comprises a processor, a network interface and a memory, wherein the processor, the network interface and the memory are connected to each other. The memory is configured for storing a computer program, and the computer program comprises program instructions. The processor is configured for invoking the program instructions to execute the active management and control method for road traffic safety of Example 1 or Example 2 above.

Figure 17:
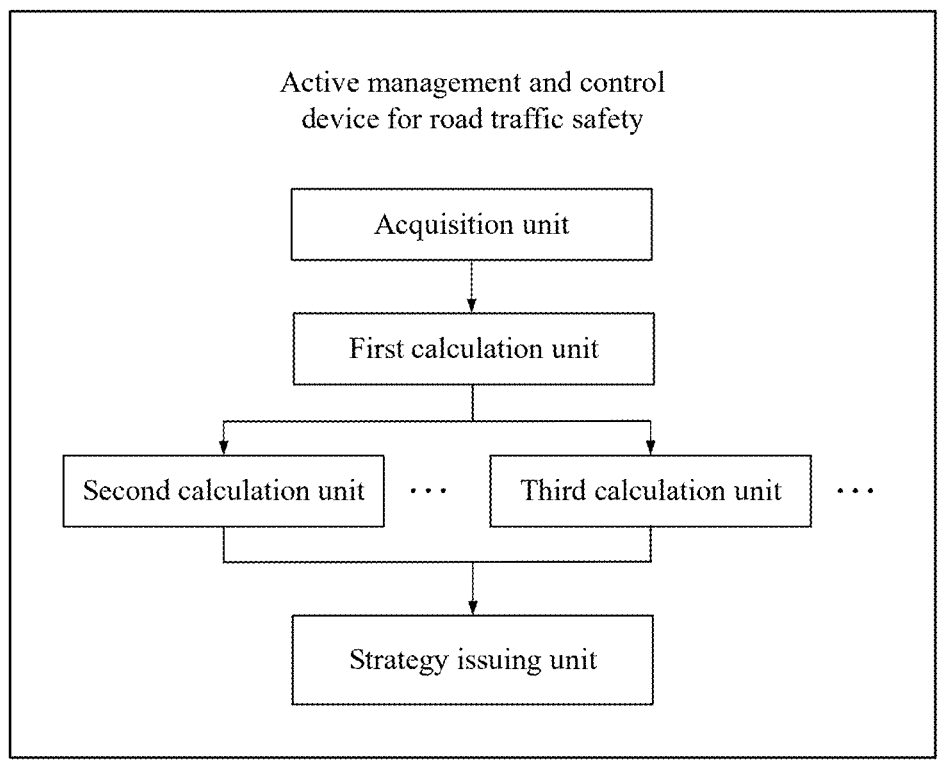
FIG. 17 is a schematic view of an architecture of an active management and control device (software unit) for road traffic safety according to an exemplary embodiment of the present invention.

In another aspect of the present invention, as shown in FIG. 17, a road traffic safety active management and control device (namely, a software functional unit) for implementing the road traffic safety active management and control method of Example 1 or Example 2 described above is provided, comprising an acquisition unit, a first calculation unit, a plurality of parallel second calculation units and third calculation units, and a strategy issuing unit;

wherein the acquisition unit is configured for acquiring traffic data of a target road in real time, and the target road comprises a plurality of management and control sections;

the first calculation unit is configured for judging whether there is a traffic accident in the acquired traffic data for each of the management and control sections; if so, starting one of the second calculation units for the management and control section where the accident occurs, and starting one of the third calculation units for the remaining management and control sections; if not, starting the third calculation unit for each of the management and control sections;

the second calculation unit is configured for formulating an emergency management and control strategy for the management and control section where the traffic accident occurs;

the third calculation unit is configured for extracting first traffic flow data from the acquired traffic data based on a first pre-set time window, generating predicted traffic flow data according to the first traffic flow data by a pre-constructed traffic flow prediction model, generating predicted traffic data based on the predicted traffic flow data, and generating a first risk level according to the predicted traffic data by a pre-constructed risk prediction model; and determining an active management and control strategy of a current time period of the management and control section according to the first risk level and the predicted traffic data by an optimization algorithm; and the strategy issuing unit is configured for issuing an emergency management and control strategy or an active management and control strategy corresponding to each of the management and control sections.

In a possible embodiment, in the above-mentioned active management and control device for road traffic safety, the acquisition unit is configured for acquiring driver data and traffic flow data from the roadside sensing apparatus, and reading road information and environment information of the target road from the vehicle road information system.

According to a specific embodiment, in the above-mentioned active management and control device for road traffic safety, the third calculation unit comprises: an extraction module configured for extracting first traffic flow data from the acquired traffic data based on a first pre-set time window; a traffic flow prediction module configured for generating predicted traffic flow data according to the first traffic flow data by a pre-constructed traffic flow prediction model, and generating predicted traffic data based on the predicted traffic flow data; a risk prediction module configured for generating a first risk level according to the predicted traffic data by a pre-constructed risk prediction model; and a strategy generation module configured for determining an active management and control strategy of a current time period of the management and control section according to the first risk level and the predicted traffic flow data by an optimization algorithm.

According to a particular embodiment, the second calculation unit is configured for, when taking the traffic accident as a time node, extracting second traffic flow data from the acquired traffic data based on a second pre-set time window, generate predicted traffic flow data according to the second traffic flow data by the pre-constructed traffic flow prediction model, generating predicted traffic data based on the predicted traffic flow data, and generating a second risk level according to the second traffic flow data by the pre-constructed risk prediction model; and generating the emergency management and control strategy based on the second risk level and the predicted traffic data by the optimization algorithm.

The storage media described in embodiments of the present invention are intended to comprise, without being limited to, these and any other suitable types of memory.

It should be understood that the disclosed system/apparatus may be implemented in other ways. For example, the partitioning of modules is merely a logical function partitioning, and actual implementations may have additional partitioning, e.g., multiple elements or components may be combined or integrated into another system, or some features may be omitted, or not performed. In another aspect, the communication connections between the modules may be indirect couplings or communication connections via some interface, severs, or units, and may be electrical, mechanical, or other forms.

In addition, each functional module in each example of the invention may be integrated in a processing unit, or each module may exist physically separately, or two or more modules may be integrated in a processing unit. The above-mentioned integrated units may be implemented in the form of hardware or in the form of software functional units.

The integrated unit, if implemented in the form of a software functional unit and sold or used as a stand-alone product, may be stored in a computer-readable storage medium. Based on this understanding, the solution of the present invention may be essentially or a part of making a contribution to the prior art or a whole or part of the solution may be embodied in the form of a software product that is stored in a storage medium and that includes instructions for causing a computer device (which may be a personal computer, a server, or a network device, etc.) to perform all or part of the steps of the methods of the various examples of the present invention. The aforementioned storage medium includes a USB flash disk, a read-only memory (ROM), a random access memory (RAM), a magnetic or optical disk, a mobile hard disk drive, and other various media capable of storing programs.

Example 4

In a further embodiment of the present invention, a specific operation method for active management using the active management apparatus for road traffic safety provided in Example 3 of the present invention is described in connection with different management sections.

Figure 18:
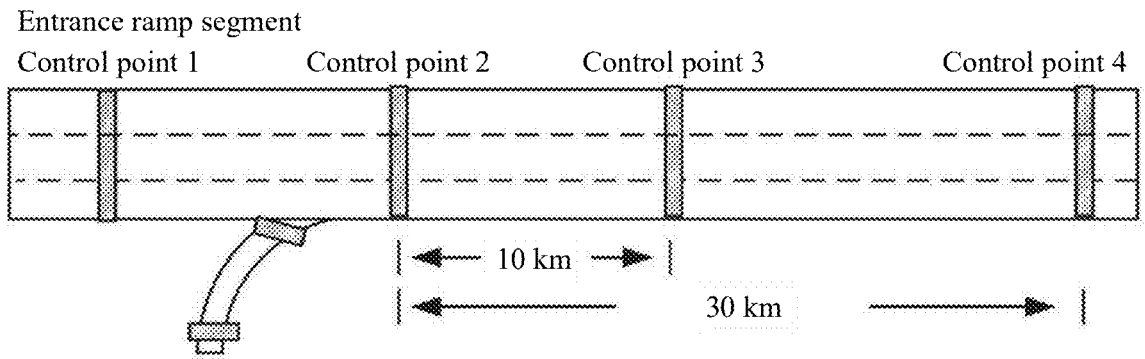
FIG. 18 is a schematic view of a ramp management and control section application according to an exemplary embodiment of the present invention.

As shown in FIG. 18, the current management and control section is a one-way three-lane road including an entrance ramp. A control point and a data acquisition device are provided on the charging portal, wherein the distance between the control point 2 and the control point 4 is too long, so that a control point is added in the middle.

At this time, the method of managing and controlling the road traffic safety active management and control device includes the steps below.

Step 1, the time window step size is set as 5 min, and the flow data at the next time step of the control point 1, the control point 2, the control point 3 and the control point 4 are obtained by the traffic flow prediction module in the road traffic active safety management and control system.

Step 2, the road perception information and the flow prediction data of each control point are input into a risk evaluation module in the road traffic active safety management control system to obtain the prediction results of the risk levels of the four control points; and when the prediction results of the four control points are all risk-free, the motor vehicle management and control is performed according to a normal management and control strategy. When only one of the four control points has the risk prediction result, the control strategy is established with the control point as the control end. When a plurality of four control points have the risk prediction results, and the control point with the highest risk level is the control end, the control strategy is formulated. In this embodiment, the control point 4 has the highest predicted risk level at the next moment, and the control point 4 is taken as the control end.

Step 3, a control strategy formulation module in the road traffic active safety management control system is executed, and the lanes are divided into a lane 1, a lane 2 and a lane 3 according to the road driving rule and according to the driving direction from right to left. In the present embodiment, the vehicle categories are classified into trucks and buses, and the buses are classified into a type-1 passenger car, a type-2 passenger car, a type-3 passenger car, and a type-4 passenger car according to the highway toll standard. The trucks are classified into a type-1 truck, a type-2 truck, a type-3 truck and a type-4 truck. Among them, the types higher than type-4 trucks are all classified into type-4 trucks.

Step 4, a vehicle type and a speed limit allowed to enter different lanes are determined on the current road section, and the corresponding limit in the present embodiment is as follows.

Lane 1 is a truck lane, which is allowed to have type-1 truck, a type-2 truck, a type-3 truck, a type-4 truck, a type-1 passenger car, a type-2 passenger car, a type-3 passenger car, and a type-4 passenger car, and the speed limit is at least 60 km/h and at most 80 km/h.

Lane 2 are an ordinary lane, which is allowed to have a type-1 truck, a type-1 passenger car, a type-2 passenger car, a type-3 passenger car, and a type-4 passenger car, and the speed limit is at least 80 km/h and at most 100 km/h.

Lane 3 is a passing lane, which is allowed to have the type-1 truck, type-1 passenger car and type-2 passenger car, and the speed limit is at least 100 km/h and at most 120 km/h.

Step 5, according to the method for generating a control strategy in the summary of the invention, a genotype corresponding to a vehicle type allowed to enter each lane is generated, and the same is solved according to an optimization strategy of a genetic algorithm.

In particular, in a regulatory section containing an entry ramp, the ramp serves as a special section in which control points should also be entered into the strategy generation module of the device.

Step 6, a vehicle control strategy of the management and control section is output.

Example 5

Figure 19:
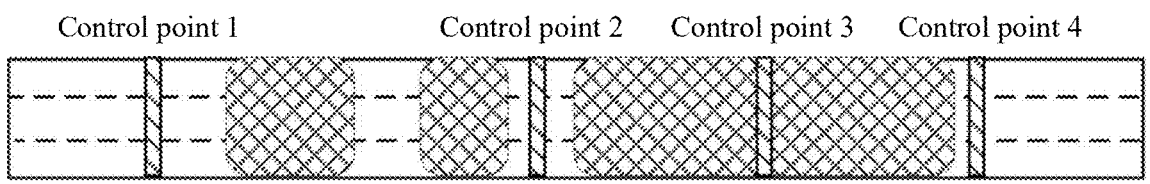
FIG. 19 is a schematic view of a tunnel management and control section application according to an exemplary embodiment of the present invention.

As shown in FIG. 19, the current management section is a one-way three-lane, including one three tunnels. There is no tollgate frame installed in the whole section. The first tunnel and the second tunnel are closer to each other, and are merged into one control point according to the layout principle of control points. The third tunnel has a larger length, and a control point is added in the middle. New control points are added at the entrance and exit of the tunnel.

At this time, the method of managing and controlling the road traffic safety active management and control device includes the steps below.

Step 1, the time window step size is set as 5 min, and the flow data at the next time step of the control point 1, the control point 2, the control point 3 and the control point 4 are obtained by the traffic flow prediction module in the road traffic active safety management and control system.

Step 2, the road perception information and the flow prediction data of each control point are input into a risk evaluation module in the road traffic active safety management control system to obtain the prediction results of the risk levels of the four control points; and when the prediction results of the four control points are all risk-free, the motor vehicle management and control is performed according to a normal management and control strategy. When only one of the four control points has the risk prediction result, the control strategy is established with the control point as the control end. When a plurality of four control points have the risk prediction results, and the control point with the highest risk level is the control end, the control strategy is formulated. In this embodiment, the control point 4 has the highest predicted risk level at the next moment, and the control point 4 is taken as the control end.

Step 3, a control strategy formulation module in the road traffic active safety management control system is executed, and the lanes divided into a lane 1, a lane 2 and a lane 3 according to the road driving rule. In this embodiment, the vehicle classless are divided into trucks and passenger cars. The passenger cars are divided into large-sized passenger cars and small-sized passenger cars according to the management requirements of the operation center, and the trucks are divided into large-sized trucks and small-sized trucks.

Among them, the small passenger cars are 7 or less, and the remaining models are classified as large passenger cars. Small trucks have 2 axles with a load of less than 2 tons, and the rest are classified as large trucks.

Step 4, the vehicle classes and speed limits allowed to enter different lanes, and in the present embodiment, Lane 1 is a truck lane, which is allowed to have small trucks, large trucks, small passenger cars and large passenger cars, and the speed limit is up to 80 km/h.

Lane 2 is an ordinary lane, which is allowed to have small trucks, small passenger cars and large passenger cars, and the speed limit is up to 100 km/h.

Lane 3 is a passing lane, which is allowed to have small trucks and small passenger cars, and the speed limit is up to 120 km/h.

Step 5, according to the method for generating a control strategy in the summary of the invention, a genotype corresponding to a vehicle type allowed to enter each lane is generated, and the same is solved according to an optimization strategy of a genetic algorithm.

Step 6, a vehicle control strategy of the management and control section is output.

Example 6

Figure 20:
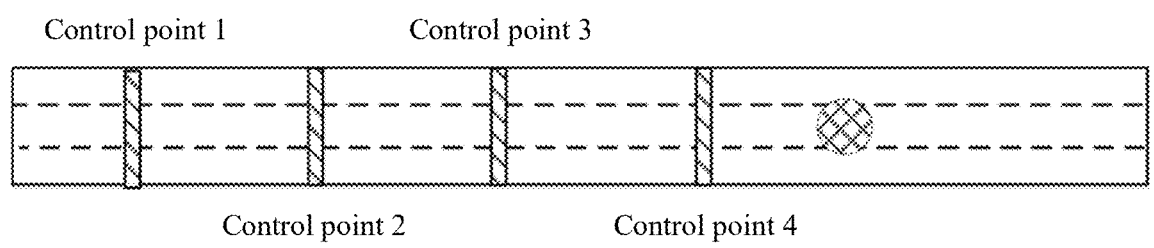
FIG. 20 is a schematic view of an incident segment management and control section application according to an exemplary embodiment of the present invention.

As shown in FIG. 20, the current management and control section is a one-way three-lane road, including a main road line and an accident point. The distance between the tollgates is reasonable and no additional control points are added. An emergency management and control module of a traffic active safety management and control system is executed. The emergency management and control module can generate a conventional emergency management and control strategy, or take the time when a traffic accident occurs as a time node. The predicted traffic flow data is generated according to traffic flow data of a current time window by pre-constructed traffic flow prediction model. The road risk level is evaluated by the pre-constructed risk prediction model, and a corresponding emergency management and control strategy is generated according to the obtained risk evaluation level by the genetic algorithm and the predicted traffic flow data.

According to the inventive content of this patent, the road traffic active safety management control system of this example is operated as follows:

Step 1, the position where the accident point occurs is located. In the present embodiment, an accident occurs on a section downstream of the control point 4, so that the control point 4 serves as a control end.

Step 2, a control strategy formulation module in the road traffic active safety management control system is executed, and the lanes divided into a lane 1, a lane 2 and a lane 3 according to the road driving rule. In this embodiment, the vehicle classless are divided into trucks and passenger cars. The passenger cars are divided into large-sized passenger cars and small-sized passenger cars according to the management requirements of the operation center, and the trucks are divided into large-sized trucks and small-sized trucks.

Among them, the small passenger cars are 7 or less, and the remaining models are classified as large passenger cars. Small trucks have 2 axles with a load of less than 2 tons, and the rest are classified as large trucks.

Step 3, the vehicle classes and speed limits allowed to enter different lanes, and in the present embodiment, Lane 1 is a truck lane, which is allowed to have small trucks, large trucks, small passenger cars and large passenger cars, and the speed limit is up to 80 km/h.

Lane 2 is an ordinary lane, which is allowed to have small trucks, small passenger cars and large passenger cars, and the speed limit is up to 100 km/h.

Lane 3 is a passing lane, which is allowed to have small trucks and small passenger cars, and the speed limit is up to 120 km/h.

In particular, historical data experience can be used to collect vehicle operating speed in different accident situations, reduce the maximum speed limit criteria, and accelerate algorithm convergence.

Step 4, according to the method for generating a control strategy in the summary of the invention, a genotype corresponding to a vehicle type allowed to enter each lane is generated, and the same is solved according to an optimization strategy of a genetic algorithm.

Step 5, a vehicle control strategy of the management and control section is output.

The foregoing is only preferred embodiments of the invention and is not intended to limit the invention. Any modifications, equivalents, and improvements within the spirit and principles of the invention are intended to be included within the scope of this invention.

The invention claimed is:

1. A method for active management and control of road traffic safety, comprising:

acquiring traffic data of a target road that comprises a plurality of management and control sections, wherein the plurality of management and control sections comprise a plurality of main line segments and one or more key nodes selected from an entrance ramp segment, an exit ramp segment, a bridge segment, a tunnel segment, a merging area, a confluence zone and an outlet segment, each of the plurality of management and control sections includes a plurality of control points and a plurality of data collection points, and the traffic data is acquired by the plurality of data collection points in real time using a camera, a coil and/or radar;

for each of the management and control sections, judging whether there is a traffic accident according to the acquired traffic data using an active management and control device comprising a processor, a network interface and a memory connected to each other, the memory storing instructions to perform the method for active management and control of road traffic safety;

when the traffic accident occurs, formulating an emergency management and control strategy and issuing an emergency management and control strategy to at least some of the plurality of control points in the management and control section prior to a point of the traffic accident using the active management and control device; and when the traffic accident does not occur, performing the following using the active management and control device:

extracting first traffic flow data from the traffic data based on a first pre-set time window, generating predicted traffic flow data according to the first traffic flow data using a pre-constructed traffic flow prediction model, generating predicted traffic data based on the predicted traffic flow data, and generating a first risk level according to the predicted traffic data using a pre-constructed risk prediction model;

determining an active management and control strategy of a current time period of the management and control section according to the first risk level and the predicted traffic data using an optimization algorithm; and issuing the active management and control strategy in the management and control section; and visually present the emergency management and control strategy or the active management and control strategy, whichever is received, to vehicles on the target road using a strategy issuing apparatus configured to receive the emergency management and control strategy and the active management and control strategy, wherein the optimization algorithm, using a current management and control section accident rate as a minimum and a section passage efficiency as a maximum in a unit time as an optimization target, obtains a position of one of the plurality of control points to be activated, and the optimization algorithm iteratively calculates the active management and control strategy corresponding to an activated one of the plurality of control points;

the active management and control strategy comprises a speed management and control strategy associated with types of vehicles on the target road, a lane in the target road, and a passage management and control strategy; and each of the plurality of control points is configured to issue the management and control strategy and is set in advance according to road management and control requirements in the management and control section.

2. The method according to claim 1, wherein the traffic data comprises driver data, traffic flow data, road data, and environment data;

the driver data comprises fatigue and dangerous driving behavior information;

the traffic flow data comprises vehicle speed information, vehicle type information and cross-section traffic flow information;

the road data comprises road line type, lane number and lane width information; and the environmental data comprises visibility, rainfall, snowfall, road friction coefficient, wind force, and wind direction information.

3. The method according to claim 1, further comprising, before the determining the active management and control strategy, judging whether the first risk level reaches a pre-set level; if so, calculating the active management and control strategy of the current time period of the management and control section according to the first risk level and the predicted traffic data by the optimization algorithm; and if not, taking a normalized control strategy as the active management and control strategy of the management and control section.

4. The method according to claim 1, wherein formulating the emergency management and control strategy comprises: using the traffic accident as a time node, extracting second traffic flow data from the acquired traffic data based on a second pre-set time window less than the first pre-set time window, generating predicted traffic flow data according to the second traffic flow data by the pre-constructed traffic flow prediction model, generating predicted traffic data based on the predicted traffic flow data, and generating a second risk level according to the predicted traffic data using the pre-constructed risk prediction model; and generating the emergency management and control strategy based on the second risk level and the predicted traffic data using the optimization algorithm.

5. The method according to claim 1, wherein the optimization algorithm comprises a genetic algorithm.

6. The method according to claim 1, wherein;
the traffic flow prediction model is constructed in advance based on a modified TST model;
the modified TST model comprises a TST model with a position vector encoding layer and a multi-headed attention mechanism layer; and
the position vector encoding layer and the multi-headed attention mechanism layer are configured to perform time sequence information modeling on an input vector.

7. The method according to claim 6, wherein the position vector encoding layer comprises a learning-type position encoder.

8. The method according to claim 6, wherein the modified TST model further comprises a masking layer disposed between the position vector encoding layer and the multi-head attention mechanism layer; and
the masking layer is based on a Softmax function to fill the position-coded input vector with a mask.

9. The method according to claim 1, wherein the risk prediction model is constructed in advance by a process comprising:
acquiring historical traffic data and historical event data corresponding to the target road, and determining a plurality of target risk level intervals based on the historical traffic data and the historical event data;
constructing a plurality of data sample vectors based on the historical traffic data, and performing normalization processing and risk level marking on the data sample vectors based on the plurality of target risk level intervals; and
training a convolution neural network using the marked data sample vectors, wherein when the convolution neural network satisfies condition convergence, the trained convolution neural network is the risk prediction model.

10. The method according to claim 1, wherein the risk prediction model is constructed in advance by a method comprising:
acquiring traffic conflict data corresponding to the target road, and determining a plurality of target risk level intervals based on the traffic conflict data; and
constructing the risk prediction model based on the traffic conflict data and the target risk level intervals.

11. An active management and control device for road traffic safety, comprising a processor, a network interface and a memory connected to each other, wherein:
the memory is configured to store instructions for an acquisition unit, a first calculation unit, a plurality of parallel second calculation units and third calculation units for a plurality of management and control sections, and a strategy issuing unit;
the processor is configured to execute the instructions;
the acquisition unit is configured to acquire traffic data of a target road in real time, and the target road comprises the plurality of management and control sections;
the first calculation unit is configured to determine from the traffic data whether there is a traffic accident in each of the management and control sections and, when the traffic accident occurs in one of the management and control sections, start the second calculation unit for the one management and control section where the accident occurs, and start the third calculation units for the remaining management and control sections; and when the traffic accident does not occur, start the third calculation unit for each of the management and control sections;

the second calculation units formulate an emergency management and control strategy for the one of the management and control sections where the traffic accident occurs;

the third calculation units extract first traffic flow data from the acquired traffic data based on a first pre-set time window, generate predicted traffic flow data according to the first traffic flow data using a pre-constructed traffic flow prediction model, generate predicted traffic data based on the predicted traffic flow data, generate a first risk level according to the predicted traffic data using a pre-constructed risk prediction model; and determine an active management and control strategy of a current time period of the management and control section according to the first risk level and the predicted traffic flow data using an optimization algorithm;

the strategy issuing unit is configured to issue the emergency management and control strategy or the active management and control strategy to each of a plurality of control points in each of the management and control sections;

the optimization algorithm, using a current management and control section accident rate as a minimum and a section passage efficiency as a maximum in a unit time as an optimization target, obtains a position of one of the plurality of control points to be activated, and the optimization algorithm iteratively calculates the active management and control strategy corresponding to an activated one of the plurality of control points;

the active management and control strategy comprises a speed management and control strategy associated with a vehicle type, a lane in the target road, and a passage management and control strategy; and each of the plurality of control points is configured to issue the management and control strategy and is set in advance according to road management and control requirements in the management and control section.

12. The active management and control device according to claim 11, wherein:

when taking the traffic accident as a time node, the second calculation unit is configured to extract second traffic flow data from the traffic data based on a second pre-set time window less than the first pre-set time window, generate predicted traffic flow data according to the second traffic flow data by the pre-constructed traffic flow prediction model, generate predicted traffic data based on the predicted traffic flow data, and generate a second risk level according to the second traffic flow data using the pre-constructed risk prediction model; and generate the emergency management and control strategy based on the second risk level and the predicted traffic data using the optimization algorithm.

13. The active management and control device according to claim 11, wherein the third calculation unit comprises:

an extraction module configured to extract first traffic flow data from the acquired traffic data based on a first pre-set time window;

a traffic flow prediction module configured to generate predicted traffic flow data according to the first traffic flow data by a pre-constructed traffic flow prediction model, and generate predicted traffic data based on the predicted traffic flow data;

a risk prediction module configured to generate a first risk level according to the predicted traffic data using a pre-constructed risk prediction model; and a strategy generation module configured to determine the active management and control strategy of the current time period of the management and control section according to the first risk level and the predicted traffic data using the optimization algorithm.

14. The active management and control device according to claim 11, wherein the active management and control strategy further comprises a road lane management and control strategy, a ramp management and control strategy, a vehicle type management and control strategy, and an emergency lane management and control strategy.

15. An active management and control system for road traffic safety, comprising:

a roadside sensing apparatus configured to acquire traffic data of a target road and transmit the traffic data, wherein the roadside sensing apparatus is at each of a plurality of data collection points in a plurality of management and control sections of a target road, wherein the plurality of management and control sections comprise a plurality of main line segments and one or more key nodes selected from an entrance ramp segment, an exit ramp segment, a bridge segment, a tunnel segment, a merging area, a confluence zone and an outlet segment;

an active management and control device for road traffic safety configured to receive the traffic data and generate and output an emergency management and control strategy or an active management and control strategy for each of the plurality of management and control sections of the target road, wherein the active management and control device output the emergency management and control strategy when a traffic accident occurs, and issues the active management and control strategy when the traffic accident does not occur; and a strategy issuing apparatus in each of a plurality of control points in each of the plurality of management and control sections of the target road, wherein each strategy issuing apparatus is configured to receive the emergency management and control strategy and the active management and control strategy and visually present the emergency management and control strategy or the active management and control strategy, whichever is received, to vehicles on the target road, wherein, when the traffic accident does not occur, the active management and control device is further configured to:

extract first traffic flow data from the traffic data based on a first pre-set time window, generate predicted traffic flow data according to the first traffic flow data using a pre-constructed traffic flow prediction model, generate predicted traffic data based on the predicted traffic flow data, and generate a first risk level according to the predicted traffic data using a pre-constructed risk prediction model; and determine the active management and control strategy of a current time period of the management and control section according to the first risk level and the predicted traffic data using an optimization algorithm that (i) determines which ones of the plurality of control points to activate from an optimization target including a current management and control section accident rate as a minimum and a section passage efficiency as a maximum in a unit time and (ii) iteratively calculates the active management and control strategy corresponding to activated ones of the plurality of control points.

16. The active management and control system according to claim 15, wherein the roadside sensing apparatus comprises radar, a camera or an integrated lidar and camera machine.

17. The active management and control system according to claim 15, wherein the strategy issuing apparatus comprises a variable information board and a V2X device.

18. The active management and control system according to claim 15, wherein the active management and control device comprises a processor, a network interface and a memory connected to each other, wherein the memory stores instructions for performing functions of the active management and control device.

19. The method according to claim 1, further comprising applying a speed management and control strategy to different types of motor vehicles in different lanes at one or more of the plurality of control points in the management and control sections receiving the active management and control strategy using the strategy issuing apparatus.

20. The method according to claim 1, wherein the plurality of control points and the plurality of data acquisition points are on a same cross-section of the target road.

* * * * *